US012566574B2

(12) United States Patent
Kaburaki et al.

(10) Patent No.: US 12,566,574 B2
(45) Date of Patent: Mar. 3, 2026

(54) MEMORY SYSTEM MANAGING CACHE IN HOST MEMORY

(71) Applicant: KIOXIA CORPORATION, Tokyo (JP)

(72) Inventors: Satoshi Kaburaki, Meguro Tokyo (JP); Naoto Oshiyama, Ota Tokyo (JP)

(73) Assignee: Kioxia Corporation, Tokyo (JP)

( * ) Notice: Subject to any disclaimer, the term of this patent is extended or adjusted under 35 U.S.C. 154(b) by 161 days.

(21) Appl. No.: 17/896,891

(22) Filed: Aug. 26, 2022

(65) Prior Publication Data

US 2023/0280942 A1 Sep. 7, 2023

(30) Foreign Application Priority Data

Mar. 2, 2022 (JP) ................................. 2022-031931

(51) Int. Cl.
*G06F 3/06* (2006.01)
(52) U.S. Cl.
CPC .......... *G06F 3/0659* (2013.01); *G06F 3/0619* (2013.01); *G06F 3/0632* (2013.01); *G06F 3/0679* (2013.01)
(58) Field of Classification Search
None
See application file for complete search history.

(56) References Cited

U.S. PATENT DOCUMENTS 7,873,788 B1 * 1/2011 Moll ................... G06F 12/0862
711/E12.051
10,628,052 B2 4/2020 Kaburaki et al.

| | | | |
|---|---|---|---|
| 10,884,927 B2 | 1/2021 | Wang et al. | |
| 2008/0225621 A1* | 9/2008 | Yoshimi | ................... G11C 5/14 |
| | | | 365/227 |
| 2014/0149607 A1* | 5/2014 | Shim | ...................... G06F 13/24 |
| | | | 710/48 |
| 2017/0199687 A1* | 7/2017 | Kohara | ............... G06F 12/0246 |
| 2017/0364446 A1* | 12/2017 | Pham | .................. G06F 12/1027 |
| 2018/0341583 A1* | 11/2018 | Son | ...................... G11C 16/349 |
| 2019/0095116 A1* | 3/2019 | Igahara | ................. G06F 3/0604 |
| 2019/0121740 A1 | 4/2019 | Kabra et al. | |
| 2019/0286325 A1* | 9/2019 | Dubeyko | ............ G06F 13/1636 |
| 2019/0339865 A1* | 11/2019 | Bains | .................. G06F 12/0246 |

(Continued)

FOREIGN PATENT DOCUMENTS

JP 2019-133252 A 8/2019

*Primary Examiner* — Kenneth M Lo
*Assistant Examiner* — Ryan Dare
(74) *Attorney, Agent, or Firm* — Kim & Stewart LLP

(57) ABSTRACT

A memory system is connectable to a host having a host memory and includes a non-volatile memory that stores management data, a memory controller configured to manage caching of parts of the management data in cache lines of the host memory, and a first memory configured to store a bitmap that includes a bit indicating whether the memory controller has accessed first data stored in the host memory after power was last supplied to the memory system. The first data indicates whether or not a part of the management data corresponding thereto is stored in one of the cache lines, and the memory controller is configured to perform either a first operation of reading the first data from the host memory or a second operation of reading an initial value of the first data managed by the memory controller, based on the bitmap.

15 Claims, 21 Drawing Sheets

(56)  References Cited

U.S. PATENT DOCUMENTS

| | | | | |
|---|---|---|---|---|
| 2020/0356493 A1* | 11/2020 | Mukherjee | .......... | G06F 9/45558 |
| 2021/0294738 A1* | 9/2021 | Tadokoro | ............ | G06F 12/0246 |
| 2023/0153198 A1* | 5/2023 | Huang | ................. | G06F 3/0679 |
| | | | | 714/723 |

\* cited by examiner

Figure 7:
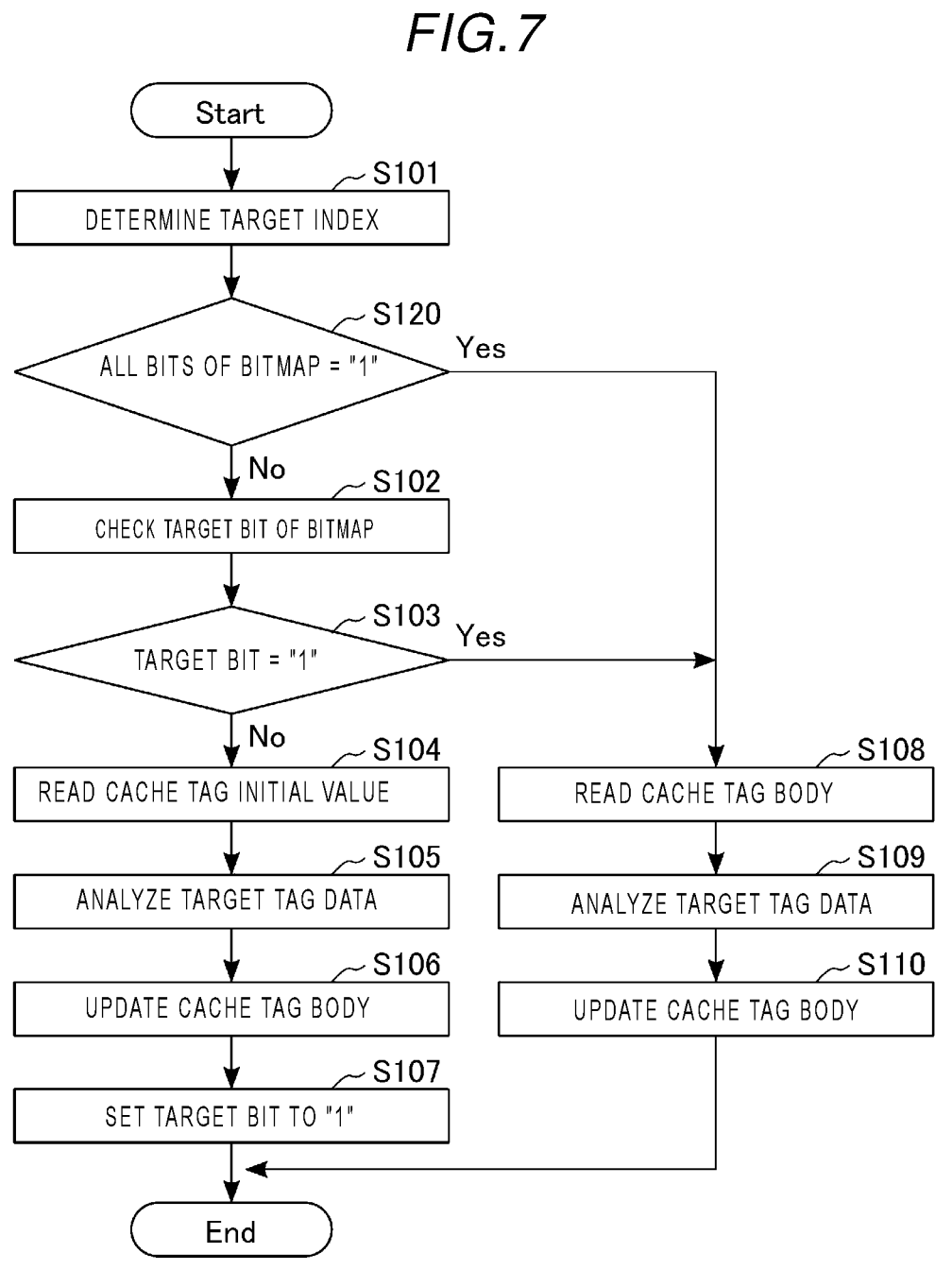

```
                    ( Start )
                        │
                        ▼            ~S101
        ┌───────────────────────────────┐
        │     DETERMINE TARGET INDEX     │
        └───────────────────────────────┘
                        │
                        ▼            ~S120
              ◇─────────────────────◇           Yes
             ◇   ALL BITS OF BITMAP = "1"   ◇──────────────┐
              ◇─────────────────────◇                      │
                        │ No                                │
                        ▼            ~S102                  │
        ┌───────────────────────────────┐                  │
        │     CHECK TARGET BIT OF BITMAP │                  │
        └───────────────────────────────┘                  │
                        │                                   │
                        ▼            ~S103  Yes             │
              ◇─────────────────────◇                      │
             ◇    TARGET BIT = "1"    ◇──────────────────┐ │
              ◇─────────────────────◇                    │ │
                        │ No                              │ │
                        ▼     ~S104                  ~S108│ │
   ┌─────────────────────────────┐   ┌──────────────────────────────┐
   │ READ CACHE TAG INITIAL VALUE │   │      READ CACHE TAG BODY      │
   └─────────────────────────────┘   └──────────────────────────────┘
                        │     ~S105                  ~S109
   ┌─────────────────────────────┐   ┌──────────────────────────────┐
   │    ANALYZE TARGET TAG DATA   │   │     ANALYZE TARGET TAG DATA   │
   └─────────────────────────────┘   └──────────────────────────────┘
                        │     ~S106                  ~S110
   ┌─────────────────────────────┐   ┌──────────────────────────────┐
   │     UPDATE CACHE TAG BODY    │   │      UPDATE CACHE TAG BODY    │
   └─────────────────────────────┘   └──────────────────────────────┘
                        │     ~S107                        │
   ┌─────────────────────────────┐                         │
   │       SET TARGET BIT TO "1"  │                         │
   └─────────────────────────────┘                         │
                        │◄────────────────────────────────┘
                        ▼
                    (  End  )
```

*FIG.8*

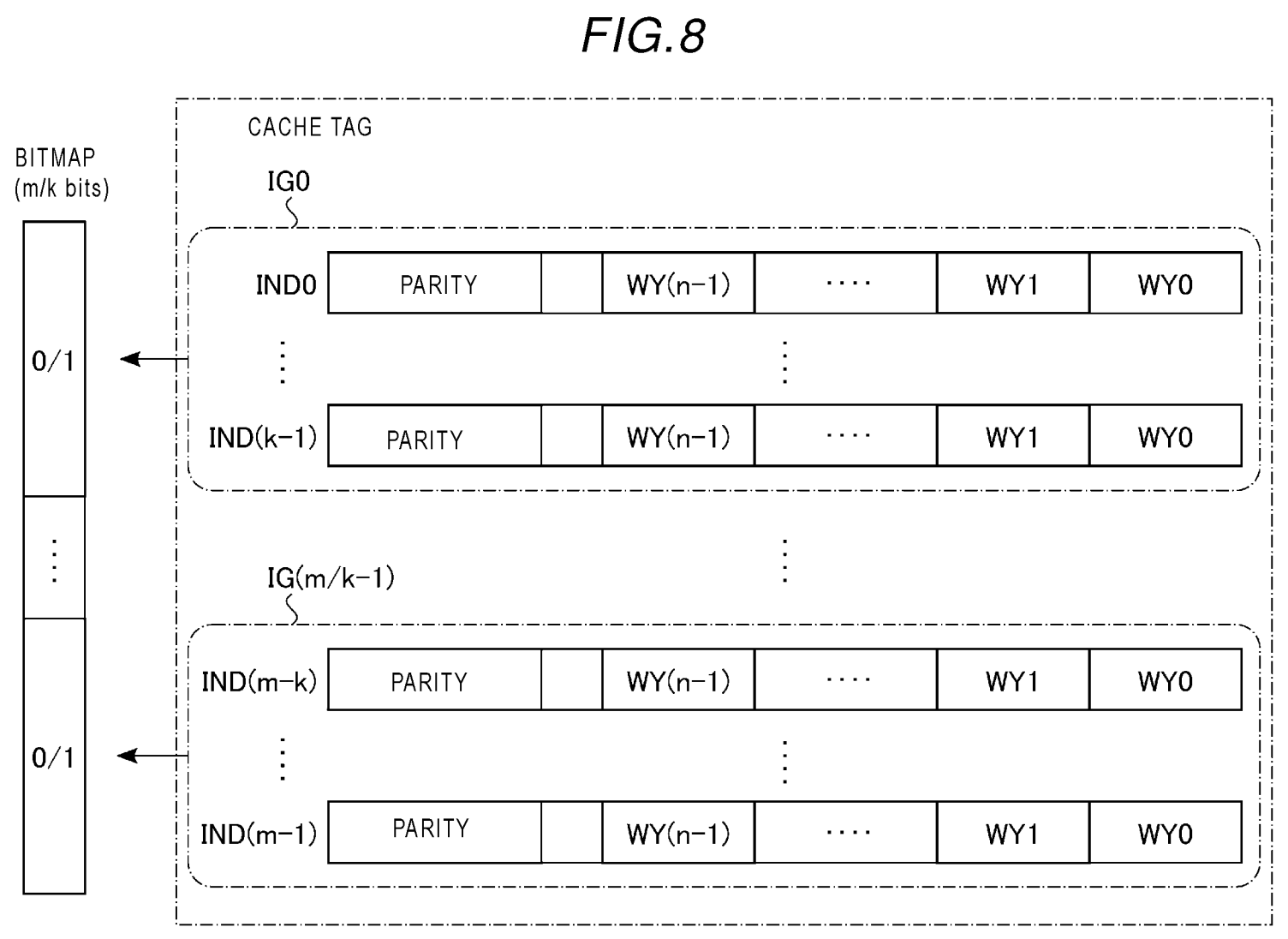

CACHE TAG

IG0

| IND0 | PARITY | WY(n-1) | ... | WY1 | WY0 |
| IND(k-1) | PARITY | WY(n-1) | ... | WY1 | WY0 |

IG(m/k-1)

| IND(m-k) | PARITY | WY(n-1) | ... | WY1 | WY0 |
| IND(m-1) | PARITY | WY(n-1) | ... | WY1 | WY0 |

BITMAP
(m/k bits)

| 0/1 | ... | 0/1 |

Figure 11:
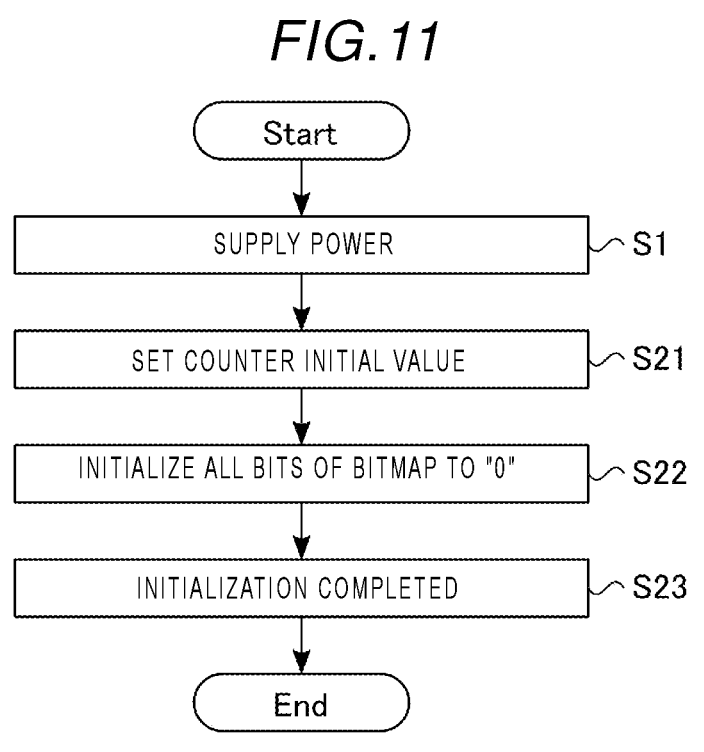

```
            ┌──────────────┐
            │    Start     │
            └──────┬───────┘
                   │
                   ▼
   ┌───────────────────────────────┐
   │        SUPPLY POWER           │───∿ S1
   └───────────────┬───────────────┘
                   │
                   ▼
   ┌───────────────────────────────┐
   │    SET COUNTER INITIAL VALUE   │───∿ S21
   └───────────────┬───────────────┘
                   │
                   ▼
   ┌───────────────────────────────┐
   │ INITIALIZE ALL BITS OF BITMAP TO "0" │───∿ S22
   └───────────────┬───────────────┘
                   │
                   ▼
   ┌───────────────────────────────┐
   │    INITIALIZATION COMPLETED    │───∿ S23
   └───────────────┬───────────────┘
                   │
                   ▼
            ┌──────────────┐
            │     End      │
            └──────────────┘
```

FIG.13
TARGET BIT : "0" (S204_No)
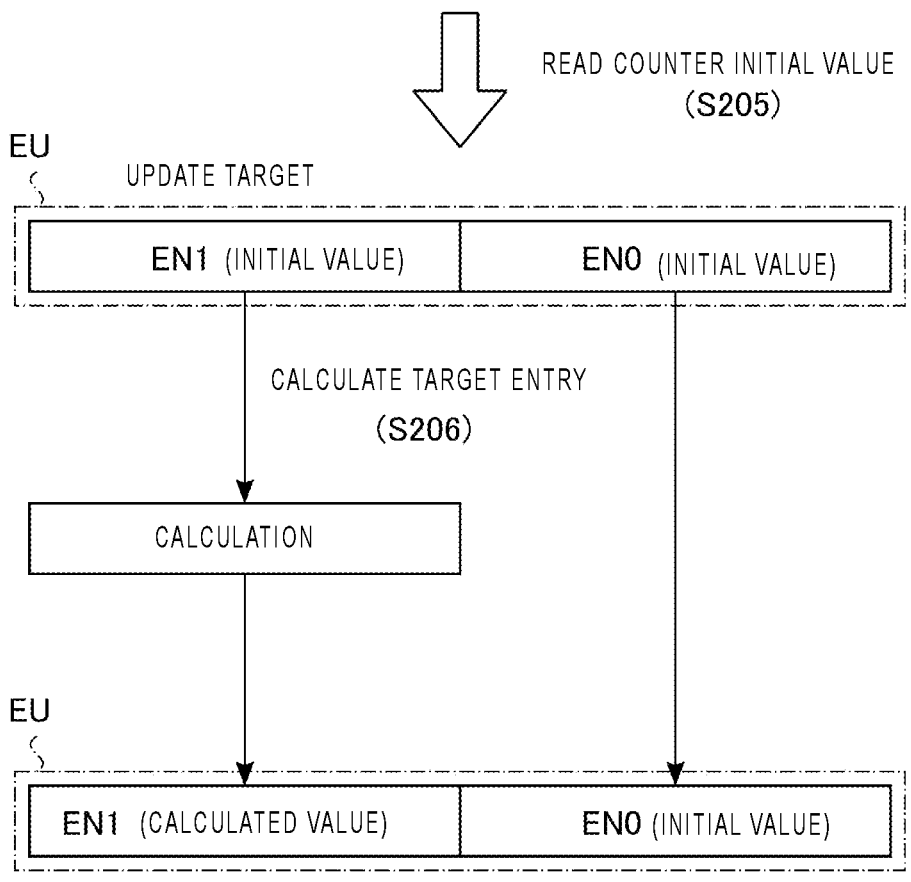
READ COUNTER INITIAL VALUE
(S205)
EU
UPDATE TARGET
| EN1 (INITIAL VALUE) | EN0 (INITIAL VALUE) |
CALCULATE TARGET ENTRY
(S206)
CALCULATION
EU
| EN1 (CALCULATED VALUE) | EN0 (INITIAL VALUE) |
UPDATE COUNT DATA BODY
(S207)
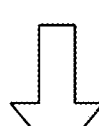
TARGET BIT : "1" (S208)

*FIG.14*

FIG.15
TARGET BIT : "0"
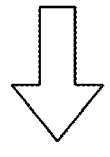
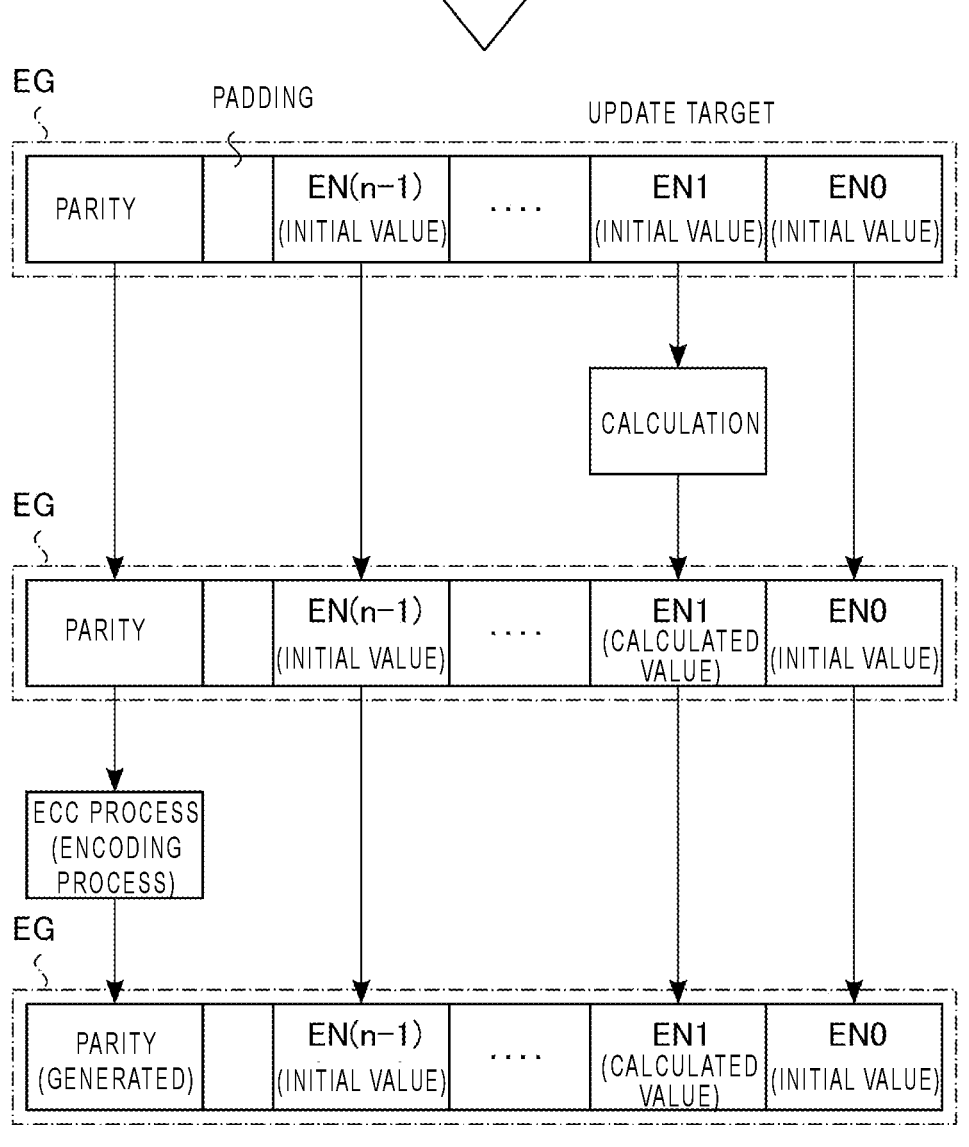
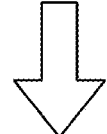
TARGET BIT : "1"

FIG.17

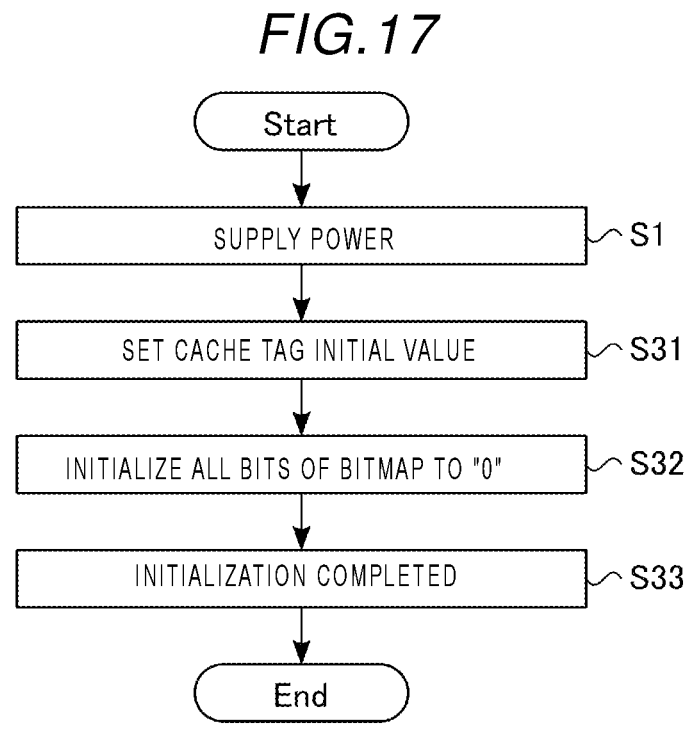

```
        ┌──────────┐
        │  Start   │
        └──────────┘
              │
              ▼
┌──────────────────────────────────┐
│          SUPPLY POWER            │──〜 S1
└──────────────────────────────────┘
              │
              ▼
┌──────────────────────────────────┐
│     SET CACHE TAG INITIAL VALUE   │──〜 S31
└──────────────────────────────────┘
              │
              ▼
┌──────────────────────────────────┐
│  INITIALIZE ALL BITS OF BITMAP TO "0" │──〜 S32
└──────────────────────────────────┘
              │
              ▼
┌──────────────────────────────────┐
│      INITIALIZATION COMPLETED     │──〜 S33
└──────────────────────────────────┘
              │
              ▼
        ┌──────────┐
        │   End    │
        └──────────┘
```

MEMORY SYSTEM MANAGING CACHE IN HOST MEMORY

CROSS-REFERENCE TO RELATED APPLICATION(S)

This application is based upon and claims the benefit of priority from Japanese Patent Application No. 2022-031931 filed Mar. 2, 2022, the entire contents of which are incorporated herein by reference.

FIELD

Embodiments described herein relate generally to a memory system.

BACKGROUND

A solid state drive (SSD) equipped with a non-volatile semiconductor memory such as a NAND-type flash memory is known as a memory system.

DESCRIPTION OF THE DRAWINGS

FIG. 5 is a flow chart of an initialization operation of a tag management unit provided in the memory system according to the first embodiment.

FIG. 7 is a flow chart of a cache tag update process in a memory system according to a first modification of the first embodiment.

FIG. 8 is a diagram illustrating a configuration of a cache tag and a bitmap in a memory system according to a second modification of the first embodiment.

FIG. 10 is a diagram illustrating a configuration of count data and a bitmap in the memory system according to the second embodiment.

FIG. 11 is a flow chart of an initialization operation of a counter management unit provided in the memory system according to the second embodiment.

FIG. 13 is a diagram illustrating an example of a data configuration of an entry unit in the memory system according to the second embodiment.

FIG. 14 is a diagram illustrating a configuration of count data and a bitmap in a memory system according to a modification of the second embodiment.

FIG. 15 is a diagram illustrating an example of a data configuration of an entry group in the memory system according to the second embodiment.

FIG. 17 is a flow chart of an initialization operation of a host memory bridge in the memory system according to the third embodiment.

DETAILED DESCRIPTION

Figure 1:
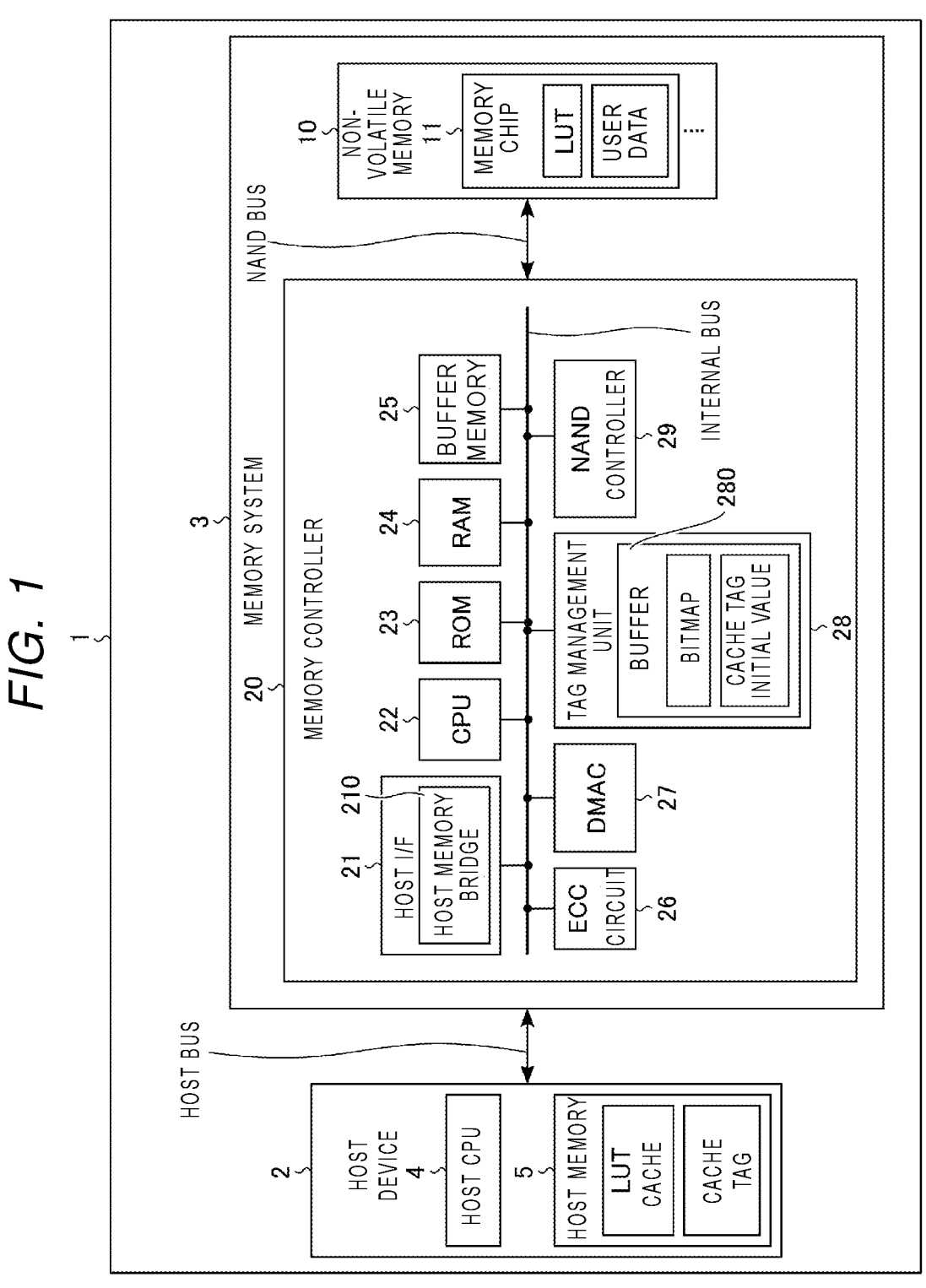
FIG. 1 is a block diagram illustrating an example of an entire configuration of an information processing system including a memory system according to a first embodiment.

Embodiments provide a memory system with a reduced start-up time.

In general, according to one embodiment, a memory system is connectable to a host having a host memory and includes a non-volatile memory configured to store management data, a memory controller configured to manage caching of parts of the management data in cache lines of the host memory, and a first memory configured to store a bitmap that includes a bit indicating whether the memory controller has accessed first data stored in the host memory after power was last supplied to the memory system. The first data indicates whether or not a part of the management data corresponding thereto is stored in one of the cache lines, and the memory controller is configured perform either a first operation of reading the first data from the host memory or a second operation of reading an initial value of the first data managed by the memory controller, based on the bitmap.

Hereinafter, embodiments will be described with reference to the accompanying drawings. The drawings are schematic. In the following description, components having substantially the same function and configuration are designated by the same reference numerals. Numbers following letters that constitute reference numerals are used to distinguish components having the same configuration from each other.

A memory system according to embodiments will be described below.

1 Configuration

1.1 Configuration of Information Processing System

1.1.1 Entire Configuration of Information Processing System

First, with reference to FIG. 1, descriptions will be made for an example of an entire configuration of an information processing system 1. FIG. 1 is a block diagram illustrating an example of the entire configuration of the information processing system 1.

As illustrated in FIG. 1, the information processing system 1 includes a host device 2 and a memory system 3. The information processing system 1 may include a plurality of host devices 2 or a plurality of memory systems 3. When the information processing system 1 includes a plurality of host devices 2 and a plurality of memory systems 3, the plurality of memory systems 3 may be connected to one host device 2. Further, the plurality of host devices 2 may be connected to one memory system 3.

The host device 2 is an information processing device (e.g., computing device) that accesses the memory system 3. The host device 2 controls the memory system 3. More specifically, for example, the host device 2 requests (commands) a write operation or a read operation of data (hereinafter, referred to as "user data") to the memory system 3.

The memory system 3 is, for example, a solid-state drive (SSD). The memory system 3 includes a non-volatile memory 10 and a memory controller 20. The memory system 3 is connected to the host device 2 via a host bus. The type of the host bus depends on the type of the memory system 3. When the memory system 3 is an SSD, for example, the host bus conforms to a peripheral component interconnect express (PCI Express® or PCIe) standard interface.

Next, descriptions will be made for an example of an internal configuration of the host device 2. The host device 2 includes a host central processing unit (CPU) 4 and a host memory 5. The host CPU 4 and the host memory 5 are connected to each other by, for example, an internal bus of the host device 2.

The host CPU 4 controls the entire information processing system 1. More specifically, for example, the host CPU 4 controls a write operation and a read operation of data in the memory system 3, that is, input/output of data to and from the memory system 3.

The host memory 5 is, for example, a volatile memory. The host memory 5 may be a dynamic random access memory (DRAM) or a static random access memory (SRAM). For example, the host memory 5 may be used as a work area when the host CPU 4 executes an operating system (OS) or an application program. Note that, in the present embodiment, descriptions will be made for a case where the host memory 5 is provided in the host device 2, but the present disclosure is not limited thereto. For example, the host memory 5 may be connected to the host bus as a single storage device. The host memory 5 may be used as a host memory buffer (HMB) defined by the non-volatile memory express (NVM Express® or NVMe) standard.

A look-up table (LUT) cache and a cache tag are stored in the host memory 5 of the present embodiment. In other words, the host memory 5 includes a memory area for storing the LUT cache and the cache tag. Therefore, the cache tag is cache data stored in the host memory 5.

The LUT cache is a part of a look-up table LUT loaded from the non-volatile memory 10 of the memory system 3. The look-up table LUT is a table used by the memory controller 20 of the memory system 3 to manage the user data stored in the non-volatile memory 10. That is, the look-up table LUT is management data. For example, the LUT cache is updated when a write operation of user data is executed. Thereafter, the memory controller 20 updates the look-up table LUT stored in the non-volatile memory 10 at any time based on the LUT cache.

The cache tag is information (tag) associated with the LUT cache. The cache tag is used to manage the LUT cache. In other words, the cache tag corresponds to the look-up table LUT. Details of the lookup table LUT, LUT cache, and cache tag will be described later. In some embodiments, the LUT cache and cache tag may be stored in a memory area (e.g., RAM 24) in the memory controller 20.

1.1.2 Configuration of Memory System

Next, descriptions will be made for an example of the configuration of the memory system 3.

The non-volatile memory 10 is a non-volatile storage device. The non-volatile memory 10 stores data received from the memory controller 20 in a non-volatile manner. Hereinafter, descriptions will be made for a case where the non-volatile memory 10 is a NAND-type flash memory. The non-volatile memory 10 may be a non-volatile storage device other than the NAND-type flash memory.

The memory controller 20 is, for example, a system-on-a-chip (SoC). In response to a request (an instruction) from the host device 2, the memory controller 20 instructs the non-volatile memory 10 to perform a read operation, a write operation, an erase operation, and the like. Further, the memory controller 20 manages the memory space of the non-volatile memory 10.

Next, descriptions will be made for an example of the internal configuration of the non-volatile memory 10. The non-volatile memory 10 includes one or more memory chips 11.

The memory chip 11 is, for example, a semiconductor chip on which a NAND-type flash memory is mounted. The memory chip 11 stores data in a non-volatile manner. The memory chip 11 is connected to the memory controller 20 via a NAND bus. The memory chip 11 may store the user data received from the host device 2 and the look-up table LUT.

The look-up table LUT is a table storing information about a relationship between a logical address and a physical address corresponding thereto. The logical address is an address used by the host device 2 to designate the user data. The physical address is an address that specifies the memory element of the non-volatile memory 10. For example, the memory controller 20 manages mapping between the logical address and the physical address using the look-up table LUT.

Next, descriptions will be made for an example of the internal configuration of the memory controller 20. The memory controller 20 includes a host interface circuit (host I/F) 21, a CPU 22, a read only memory (ROM) 23, the random access memory (RAM) 24, a buffer memory 25, an error checking and correcting (ECC) circuit 26, a direct memory access controller (DMAC) 27, a tag management unit 28, and one or more NAND controllers 29. These circuits are connected to each other, for example, by an internal bus. Note that, the respective functions of the host interface circuit 21, the ECC circuit 26, the tag management unit 28, and the NAND controller 29 may be implemented by a dedicated circuit or by the CPU 22 executing firmware.

The host interface circuit 21 is an interface circuit connected to the host device 2. The host interface circuit 21 communicates between the host device 2 and the memory controller 20. The host interface circuit 21 transmits the request and the user data received from the host device 2 to the CPU 22 and the buffer memory 25, respectively. Further, the host interface circuit 21 transmits the user data in the buffer memory 25 to the host device 2 in response to the instruction of the CPU 22.

The host interface circuit 21 includes a host memory bridge 210. The host memory bridge 210 controls communication between the tag management unit 28 and the host memory 5. The host memory bridge 210 controls the write and read operations of the cache tag in the host memory 5.

The CPU 22 is a processor. The CPU 22 controls the entire operation of the memory controller 20. For example, the CPU 22 instructs the non-volatile memory 10 to perform a write operation, a read operation, and an erase operation based on the request from the host device 2.

Further, the CPU 22 performs various processes for managing the non-volatile memory 10, such as a garbage collection, refreshing, and wear leveling.

The garbage collection is also known as a compaction. The garbage collection is a process of reading (collecting) valid data from a plurality of blocks of the non-volatile memory 10 and rewriting (copying) the data to another block.

The refreshing is a process of rewriting data in a block to another block or the same block when the deterioration of data in the block is detected. For example, data deterioration indicates a state in which the number of corrected bits in a data error correction process has increased.

The wear leveling is a process of leveling the number of erase operations of each of a plurality of blocks of the non-volatile memory 10 by, for example, exchanging data stored in a block having a relatively large number of erase operations with data stored in a block having a relatively small number of erase operations.

The ROM 23 is a non-volatile memory. For example, the ROM 23 is an electrically erasable programmable read-only memory (EEPROM®). The ROM 23 is a non-volatile storage medium for storing firmware and programs. For example, the CPU 22 loads the firmware from the ROM 23 into the RAM 24 and executes the firmware.

The RAM 24 is a volatile memory. The RAM 24 is a DRAM or an SRAM. The RAM 24 may be used as a work area for the CPU 22. For example, the RAM 24 stores firmware for managing the non-volatile memory 10 and various management tables.

The buffer memory 25 is a volatile memory. The buffer memory 25 is a DRAM or an SRAM. The buffer memory 25 temporarily stores the user data read from the non-volatile memory 10 by the memory controller 20, and the user data received from the host device 2.

The ECC circuit 26 is a circuit that performs an error checking and correction (ECC) process. The ECC process includes a data encoding process and a data decoding process. For example, when writing data (e.g., to the host memory 5), the ECC circuit 26 performs the data encoding process to generate an error correction code (e.g., parity). The ECC circuit 26 adds the generated parity to data. Further, the ECC circuit 26 performs the data decoding process when reading data (e.g., from the host memory 5). That is, the ECC circuit 26 performs a data error correction using the parity.

The DMAC 27 is a hardware module for data transfer. For example, the DMAC 27 performs the data transfer when a data transfer destination, a transfer source start address, and a transfer data size are designated by the CPU 22. The memory controller 20 may include one or more DMACs 27. For example, the DMAC 27 may be used to transfer a cache tag initial value or a fixed value such as all "0" to the host memory 5. The cache tag initial value will be described later.

The tag management unit 28 is a circuit that manages the cache tag and the LUT cache. For example, the tag management unit 28 controls an operation of reading the cache tag from the host memory 5 and an operation of writing the cache tag to the host memory 5. For example, the tag management unit 28 accesses the host memory bridge 210 and causes the host memory bridge 210 to perform a read operation and a write operation of the cache tag. Further, the tag management unit 28 refers to the cache tag and performs a hit/miss determination operation, a refill line determination operation, and a least recently used (LRU) update operation. The tag management unit 28 may perform the hit/miss determination operation, the refill line determination operation, and the LRU update operation without accessing the LUT cache. Hereinafter, the hit/miss determination operation, the refill line determination operation, and the LRU update operation are collectively referred to as an "analysis operation". The tag management unit 28 writes back the cache tag updated by the analysis operation to the host memory 5 (hereinafter, also referred to as a "cache tag update process").

The hit/miss determination operation is an operation of determining whether the mapping information being searched for is included in the LUT cache. For example, the tag management unit 28 performs a hit/miss determination without even referring to the LUT cache.

The refill line determination operation is an operation of determining a cache line to be updated. For example, the LUT cache includes a plurality of cache lines. Each cache line is a unit of data management in the LUT cache. That is, the cache line is part of the LUT cache. For example, the memory controller 20 may transmit/receive data to/from the non-volatile memory 10 in units of cache lines. The cache line includes a plurality of pieces of mapping information of a set of a logical address and a physical address corresponding thereto. A plurality of logical addresses stored in the cache line may be consecutive. The tag management unit 28 determines a cache line (i.e., a "refill line") for refilling (filling) a part of the data of the look-up table LUT stored in the non-volatile memory 10. For example, when the mapping information required for the read operation of user data is not included in the LUT cache, the tag management unit 28 executes the refill line determination operation.

The LRU update operation is an operation of evicting (erasing) data in a cache line that is infrequently used. Since the storage capacity of the LUT cache is limited, infrequently used data may be appropriately overwritten by other data. For example, the tag management unit 28 selects the cache line having the longest elapsed time since it was last used, and deletes the data of the selected cache line. For example, when there is no empty cache line in executing the refill line determination operation, the tag management unit 28 performs the LRU update operation and determines the cache line that should be evicted.

The tag management unit 28 includes a buffer 280. The buffer 280 is a volatile memory. For example, a bitmap and the cache tag initial value are stored in the buffer 280. Alternatively, the bitmap or cache tag initial value may be stored in the RAM 24.

The bitmap is a collection of a plurality of pieces of 1-bit data, each indicating whether the corresponding index is referred to after power was last supplied to the memory system 3. The index is a unit of data that is collectively processed in the read operation and the write operation of the cache tag. The cache tag includes a plurality of indexes. That is, the plurality of indexes are stored in the host memory 5. Details of the configuration of the index will be described later. For example, when an index has not been read from the host memory 5 after power was last supplied to the memory system 3, that is, when the index has not been referred to, the tag management unit 28 sets the corresponding bit of the bitmap to "0" data. Meanwhile, when an index has been read from the host memory 5 after power was last supplied to the memory system 3, that is, when the index has been referred to, the tag management unit 28 sets the corresponding bit of the bitmap to "1" data.

When the corresponding bit of the bitmap is "0", the cache tag initial value is an initial value used by the tag management unit 28. When a bit of the bitmap is "0", the tag management unit 28 does not read the corresponding index from the host memory 5 when referring to (reading) the index, and reads the cache tag initial value stored in the buffer 280. Meanwhile, when a bit of the bitmap is "1", the tag management unit 28 reads the corresponding index from the host memory 5. The tag management unit 28 manages the cache tag initial value. The tag management unit 28 may have a plurality of cache tag initial values. For example, the tag management unit 28 may select one of the plurality of cache tag initial values based on the data structure of the look-up table LUT stored in the non-volatile memory 10.

The NAND controller 29 controls the memory chip 11. The NAND controller 29 transmits a command corresponding to a write operation, a read operation, or an erase operation to the memory chip 11. Further, the NAND controller 29 receives read data from the memory chip 11 during the read operation. For example, one NAND controller 29 may control a plurality of memory chips 11. The memory controller 20 may include one or more NAND controllers 29.

1.1.3 Configuration of Memory Chip

Figure 2:
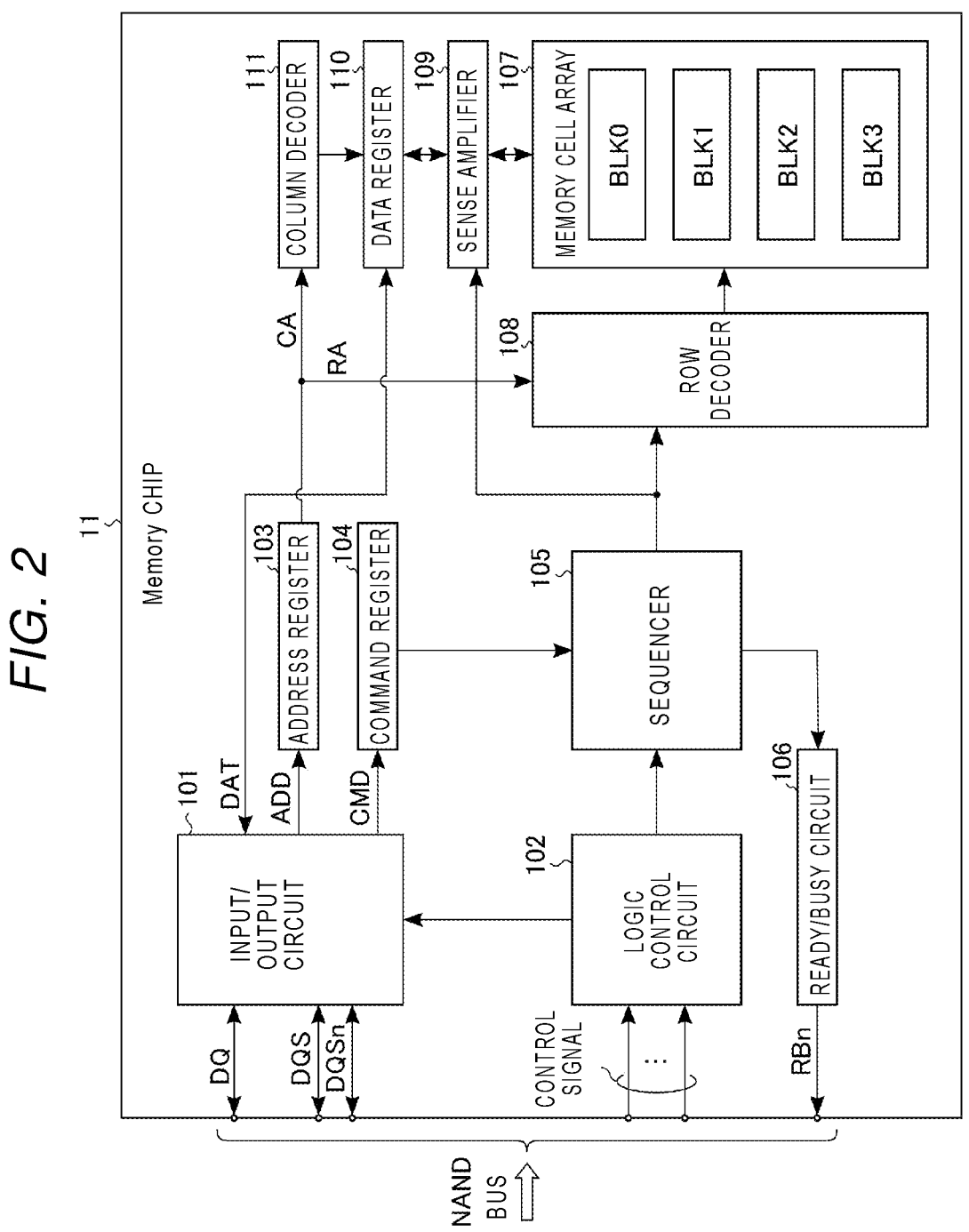
FIG. 2 is a block diagram illustrating a configuration of a memory chip provided in the memory system according to the first embodiment.

Next, with reference to FIG. 2, descriptions will be made for an example of the configuration of the memory chip 11. FIG. 2 is a block diagram illustrating a configuration of the memory chip 11. In the example illustrated in FIG. 2, a part of the connections between components is indicated by an arrow line. However, the connections between the components are not limited to the example illustrated in FIG. 2.

As illustrated in FIG. 2, the memory chip 11 transmits and receives a signal DQ and timing signals DQS and DQSn to and from the memory controller 20 (more specifically, the NAND controller 29) via the NAND bus. The signal DQ is, for example, data DAT, an address ADD, or a command CMD. The timing signals DQS and DQSn are timing signals used for input/output of data DAT. The timing signal DQSn is an inverted signal of the timing signal DQS.

Further, the memory chip 11 receives various control signals from the memory controller 20 via the NAND bus. The memory chip 11 transmits a ready/busy signal RBn to the memory controller 20 via the NAND bus. The ready/busy signal RBn is a signal indicating whether the memory chip 11 is not in a state that is capable of receiving the command CMD from the memory controller 20 (busy state) or in a state that is capable of receiving the command CMD from the memory controller 20 (ready state).

Next, descriptions will be made for the internal configuration of the memory chip 11. The memory chip 11 includes an input/output circuit 101, a logic control circuit 102, an address register 103, a command register 104, a sequencer 105, a ready/busy circuit 106, a memory cell array 107, a row decoder 108, a sense amplifier 109, a data register 110, and a column decoder 111.

The input/output circuit 101 is a circuit that inputs/outputs the signal DQ. The input/output circuit 101 is connected to the memory controller 20. Further, the input/output circuit 101 is connected to the logic control circuit 102, the address register 103, the command register 104, and the data register 110.

When the input signal DQ is an address ADD, the input/output circuit 101 transmits the address ADD to the address register 103. Further, when the input signal DQ is a command CMD, the input/output circuit 101 transmits the command CMD to the command register 104.

When the input signal DQ is data DAT, the input/output circuit 101 receives the input signal DQ based on the timing signals DQS and DQSn. Then, the input/output circuit 101 transmits the data DAT to the data register 110. Further, the input/output circuit 101 outputs data DAT to the memory controller 20 together with the timing signals DQS and DQSn.

The logic control circuit 102 is a circuit that performs a logic control based on a control signal. The logic control circuit 102 is connected to the memory controller 20. Further, the logic control circuit 102 is connected to the input/output circuit 101 and the sequencer 105. The logic control circuit 102 receives various control signals from the memory controller 20. The logic control circuit 102 controls the input/output circuit 101 and the sequencer 105 based on the received control signals.

The address register 103 is a register that temporarily stores the address ADD. The address register 103 is connected to the input/output circuit 101, the row decoder 108, and the column decoder 111. The address ADD includes a row address RA and a column address CA. The address register 103 transmits the row address RA to the row decoder 108. Further, the address register 103 transmits the column address CA to the column decoder 111.

The command register 104 is a register that temporarily stores the command CMD. The command register 104 is connected to the input/output circuit 101 and the sequencer 105. The command register 104 transmits the command CMD to the sequencer 105.

The sequencer 105 is a circuit that controls the memory chip 11. The sequencer 105 controls the entire operation of the memory chip 11. More specifically, for example, the sequencer 105 controls the ready/busy circuit 106, the row decoder 108, the sense amplifier 109, the data register 110, and the column decoder 111. The sequencer 105 performs a write operation, a read operation, or an erase operation based on the command CMD.

The ready/busy circuit 106 is a circuit that transmits the ready/busy signal RBn. The ready/busy circuit 106 transmits the ready/busy signal RBn to the memory controller 20 according to the operating status of the sequencer 105.

The memory cell array 107 is a set of a plurality of memory cell transistors arranged in a matrix form. The memory cell array 107 includes, for example, four blocks BLK0, BLK1, BLK2, and BLK3. For example, the look-up table LUT is stored in some of the blocks, and the user data is stored in some of the blocks. The number of blocks in the memory cell array 107 may be any number. The block BLK is, for example, a set of a plurality of memory cell transistors whose data is erased all at once, and is a data erasing unit. Details of the configuration of the block BLK will be described later.

The row decoder 108 is a decoding circuit of the row address RA. The row decoder 108 selects any block BLK in the memory cell array 107 based on the decoding result. The row decoder 108 applies a voltage to the wiring in the row direction (a word line and a select gate line to be described later) of the selected block BLK.

The sense amplifier 109 is a circuit that writes and reads data DAT. The sense amplifier 109 is connected to the memory cell array 107 and the data register 110. The sense amplifier 109 reads the data DAT from the memory cell array 107 during a read operation. Further, the sense amplifier 109 supplies a voltage corresponding to write data DAT to the memory cell array 107 during a write operation.

The data register 110 is a register that temporarily stores data DAT. The data register 110 is connected to the sense amplifier 109 and the column decoder 111. The data register 110 includes a plurality of latch circuits. Each of the latch circuits temporarily stores write data or read data.

The column decoder 111 is a circuit that decodes the column address CA. The column decoder 111 receives the column address CA from the address register 103. The column decoder 111 selects the latch circuit in the data register 110 based on the decoding result of the column address CA.

1.1.4 Circuit Configuration of Memory Cell Array

Figure 3:
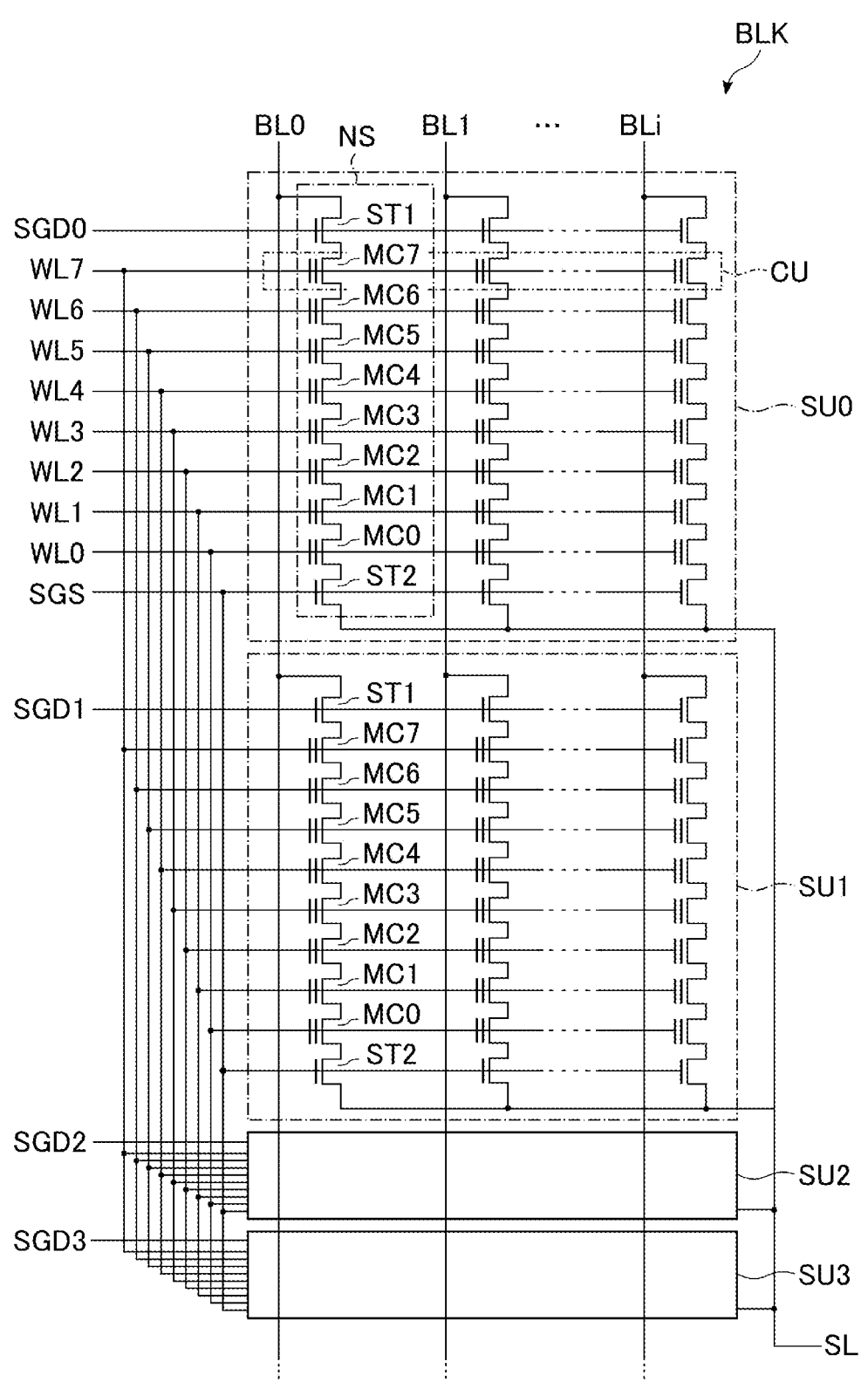
FIG. 3 is a circuit diagram illustrating an example of a circuit configuration of a memory cell array provided in the memory system according to the first embodiment.

Next, with reference to FIG. 3, descriptions will be made for an example of the circuit configuration of the memory cell array 107. FIG. 3 is a circuit diagram illustrating an example of the circuit configuration of the memory cell array 107.

The block BLK includes, for example, four string units SU0 to SU3. The number of string units SU provided in the block BLK may be any number. The string unit SU is, for example, a set of a plurality of NAND strings NS that is collectively selected in a write operation or a read operation.

Next, the internal configuration of the string unit SU will be described. The string unit SU includes a plurality of NAND strings NS. The NAND string NS is a set of a plurality of memory cell transistors connected in series. Each of the plurality of NAND strings NS in the string unit SU is connected to one of the bit lines BL0 to BLi (i is an integer of 1 or more).

Next, the internal configuration of the NAND string NS will be described. Each NAND string NS includes a plurality of memory cell transistors MC and select transistors ST1 and ST2. In the example illustrated in FIG. 3, the NAND string NS includes eight memory cell transistors MC0 to MC7.

The memory cell transistor MC is a memory element that stores data in a non-volatile manner. The memory cell transistor MC includes a control gate and a charge storage layer. The memory cell transistor MC may be a metal-oxide-nitride-oxide-silicon (MONOS) type or a floating gate (FG) type.

The select transistors ST1 and ST2 are switching elements. The select transistors ST1 and ST2 are used for selecting the string unit SU during various operations.

The current paths of the select transistor ST2, the memory cell transistors MC0 to MC7, and the select transistor ST1 in the NAND string NS are connected in series. A drain of the select transistor ST1 is connected to a bit line BL. A source of the select transistor ST2 is connected to a source line SL.

The control gates of the memory cell transistors MC0 to MC7 of the same block BLK are commonly connected to word lines WL0 to WL7, respectively. More specifically, for example, the block BLK includes four string units SU0 to SU3. Each string unit SU includes a plurality of memory cell transistors MC0. The control gates of the plurality of memory cell transistors MC0 in the block BLK are commonly connected to the word line WL0. The same applies to the memory cell transistors MC1 to MC7.

The gates of the plurality of select transistors ST1 in the string unit SU are commonly connected to a select gate line SGD. More specifically, the gates of the plurality of select transistors ST1 in the string unit SU0 are commonly connected to a select gate line SGD0. The gates of the plurality of select transistors ST1 in the string unit SU1 are commonly connected to a select gate line SGD1. The gates of the plurality of select transistors ST1 in the string unit SU2 are commonly connected to a select gate line SGD2. The gates of the plurality of select transistors ST1 in the string unit SU3 are commonly connected to a select gate line SGD3.

The gates of the plurality of select transistors ST2 in the block BLK are commonly connected to a select gate line SGS.

The word lines WL0 to WL7, the select gate lines SGD0 to SGD3, and the select gate line SGS are respectively connected to the row decoder 108.

The bit line BL is commonly connected to one NAND string NS in each of the plurality of string units SU of each block BLK. Each bit line BL is connected to the sense amplifier 109.

The source line SL is shared, for example, among a plurality of blocks BLK.

A set of a plurality of memory cell transistors MC connected to a common word line WL in one string unit SU is referred to as, for example, a "cell unit CU". In other words, the cell unit CU is a set of a plurality of memory cell transistors MC that is collectively selected in a write operation or a read operation. A page is a unit of data that is collectively written (or collectively read) to (from) the cell unit CU. For example, when the memory cell transistor MC stores 1-bit data, the storage capacity of the cell unit CU is 1 page. The cell unit CU may have a storage capacity of two or more pages based on the number of bits of data stored in the memory cell transistor MC.

The data of one page includes a plurality of clusters. For example, in the read operation of the memory chip 11, a cell unit CU is selected, and data is read from the memory cell array 107 to the sense amplifier 109 in page units. The read data is stored in the data register 110. The data stored in the data register 110 may be transmitted to the memory controller 20 for each cluster.

1.2 Configuration of LUT Cache, Cache Tag, and Bitmap

Figure 4:
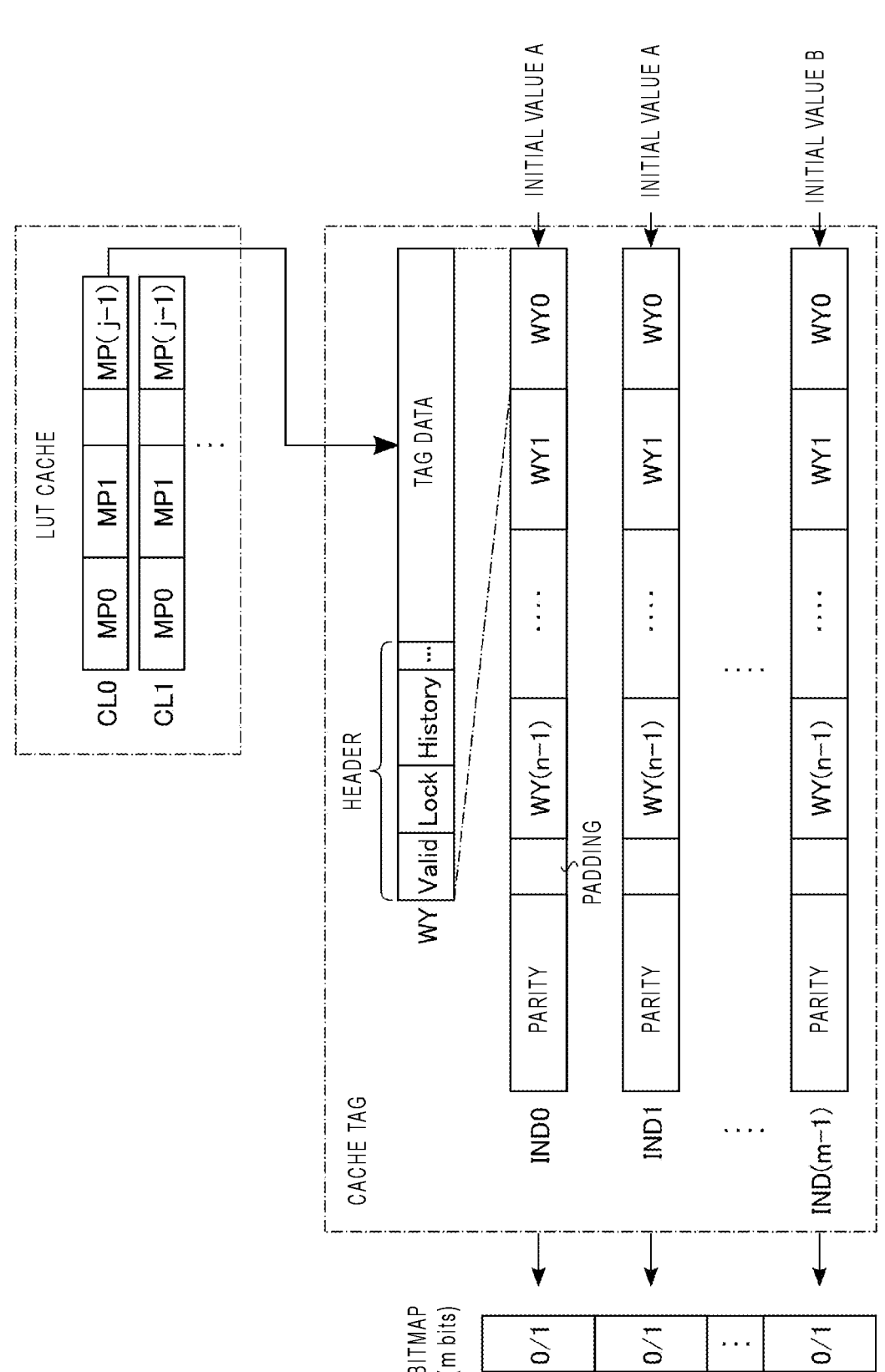
FIG. 4 is a diagram illustrating a configuration of a look-up table (LUT) cache, a cache tag, and a bitmap in the memory system according to the first embodiment.

Next, with reference to FIG. 4, descriptions will be made for an example of the configuration of the LUT cache, the cache tag, and the bitmap. FIG. 4 is a diagram illustrating the configuration of the LUT cache, the cache tag, and the bitmap.

As illustrated in FIG. 4, the LUT cache includes a plurality of cache lines CL (CL0, CL1, . . . ). Each cache line CL includes a plurality of pieces of mapping information MP that indicates the relationship between a logical address and a physical address. In the example illustrated in FIG. 4, each cache line CL includes j (j is an integer of 1 or more) pieces of mapping information MP. In the embodiments, the mapping information MP contained in one cache line is for logical addresses having common upper bits (e.g., bits [31:20]), common middle bits (e.g., bits [19:10]), and different lower bits (e.g., bits [9:3]).

The cache tag includes a plurality of indexes IND. In the example illustrated in FIG. 4, the cache tag includes m indexes IND0 to IND(m-1) (m is an integer of 1 or more).

The index IND includes a plurality of ways WY, parity, and padding data. The way WY is data corresponding to one cache line CL. Therefore, the index IND corresponds to a plurality of cache lines CL that include mapping information MP for logical addresses having common middle bits (e.g., bits [19:10]), different upper bits (e.g., bits [31:20]), and different lower bits (e.g., bits [9:3]). In the example illustrated in FIG. 4, the index IND includes n ways WY0 to WY(n−1) (n is an integer of 1 or more).

The way WY includes tag data and a header. The tag data is data indicating which area of the entire lookup table LUT to which the mapping information MP included in the corresponding cache line CL belongs. For example, the tag data includes upper bits (e.g., bits [31:20]) of logical addresses that are included in the mapping information MP. The header includes management information of the tag data. More specifically, for example, the header includes a valid flag, a lock flag, and history data. For example, the valid flag indicates whether the tag data is valid or invalid. The lock flag indicates whether the tag data can be over-written. For example, when the tag data is locked, the cache line CL corresponding to the way WY is excluded from the target of the LRU update operation. The history data indicates when the way WY (tag data) was last referenced. For example, the tag management unit 28 performs the LRU update operation based on the history data.

The parity is generated based on n ways WY in the index IND. Therefore, the index IND is a unit of data processing in the ECC process. The tag management unit 28 performs a read operation and a write operation of the cache tag in units of index IND.

The padding data is invalid data that is inserted into the index IND. The index IND is data having a fixed size. The padding data is inserted into the index IND when a total size of the plurality of ways WY and the parity is less than the fixed size. In some embodiments, the index IND does not include the padding data.

In the bitmap of the present embodiment, 1-bit data is assigned to one index IND. Therefore, the bitmap has m-bit data.

In the example illustrated in FIG. 4, when the cache tag initial value is used instead of the index IND0 or IND1, an initial value A is used. When the cache tag initial value is used instead of the index IND(m−1), an initial value B is used.

1.3 Initialization Operation of Tag Management Unit after Supplying Power

Figure 5:
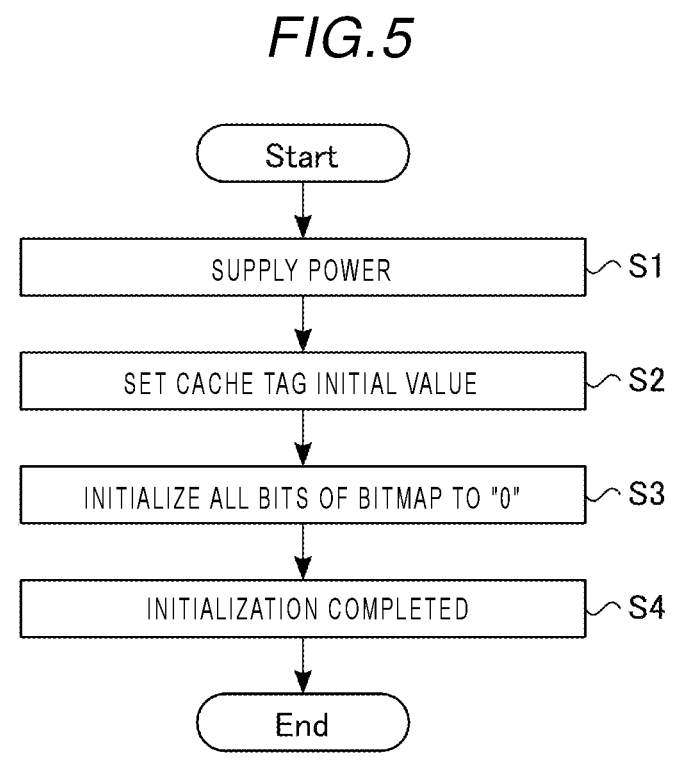

Next, with reference to FIG. 5, descriptions will be made for an example of the initialization operation of the tag management unit 28 after power is supplied to the memory system 3. FIG. 5 is a flow chart of the initialization operation of the tag management unit 28.

As illustrated in FIG. 5, power is supplied to the memory system 3 (S1). As a result, the memory controller 20 starts start-up operations. The memory controller 20 executes the initialization operation of the tag management unit 28 as one of the start-up operations.

The tag management unit 28 sets the cache tag initial value used for each index IND (S2). The cache tag initial value of each index IND may be the same or may be different for each index IND. Further, the cache tag initial value may be set per index IND or per way WY.

The tag management unit 28 initializes all bits of the bitmap stored in the buffer 280 to "0" (S3). Note that, steps S2 and S3 may be performed at the same time, or the order may be reversed.

As a result, the initialization operation of the tag management unit 28 ends (S4). The memory controller 20 does not initialize the cache tag in the host memory 5 in the start-up operation.

1.4 Cache Tag Update Process

Figure 6:
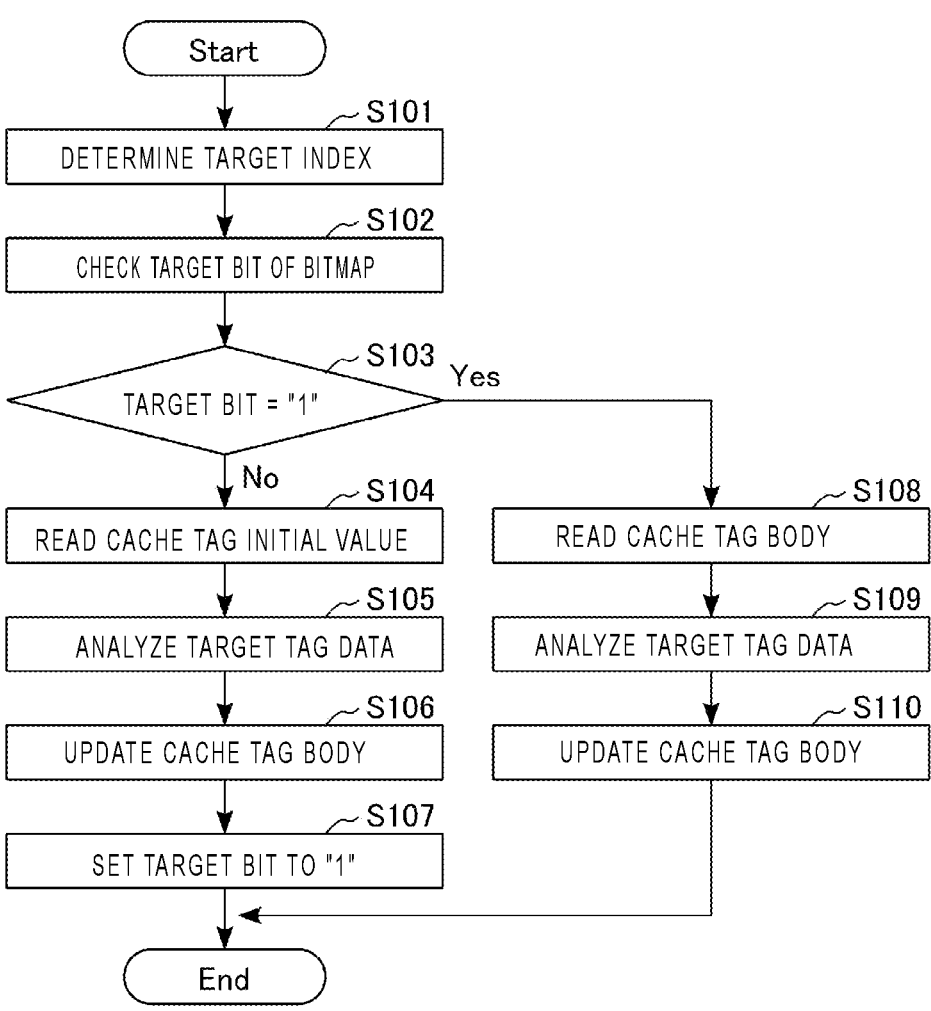
FIG. 6 is a flow chart of a cache tag update process in the memory system according to the first embodiment.

Next, with reference to FIG. 6, descriptions will be made for an example of a cache tag update process, which is triggered after the initialization operation of FIG. 5, e.g., when a logical-to-physical address conversion is being carried out in connection with a read request or a write request. FIG. 6 is a flow chart of the cache tag update process.

As illustrated in FIG. 6, the tag management unit 28 first determines an index IND (target index IND) including tag data (target tag data) that is a target of the cache tag update process (S101). The target index IND is determined, for example, from the middle bits (e.g., bits [19:10]) of a logical address that is the target of the read request or the write request.

The tag management unit 28 checks a bit (target bit) of the bitmap which bit corresponds to the target index IND (S102).

When the target bit is not "1" ("No" in S103), that is, when the target bit is "0", the tag management unit 28 reads the cache tag initial value from the buffer 280 (S104).

The tag management unit 28 then performs an analysis operation of the target tag data using the cache tag initial value (S105). More specifically, the ECC circuit 26 first performs an ECC process (decoding process) of the target index IND (cache tag initial value). The tag management unit 28 performs the analysis operation of the target tag data using the target index IND (cache tag initial value) after the ECC process. For example, through the analysis operation, the tag management unit 28 determines that the valid flag of the cache tag initial value indicates invalidity. Therefore, the tag management unit 28 determines that the target tag data is a miss in the hit/miss determination operation.

The tag management unit 28 updates the cache tag stored in the host memory 5 (hereinafter, also referred to as a "cache tag body") based on the result of the analysis operation of the target tag data included in the target index IND (cache tag initial value) (S106). For example, as a result of the analysis operation of the target tag data, the tag management unit 28 updates the index IND from the cache tag initial value. At this time, the LUT cache may also be updated. More specifically, for example, the tag management unit 28 updates the tag data, the valid flag of the header, and the history data of the header, of one or more ways WY in the target index IND. Note that, among the plurality of ways WY in the target index IND, some ways WY may still have the cache tag initial value. The ECC circuit 26 generates the parity corresponding to the index IND. The tag management unit 28 generates the index IND including the plurality of updated ways WY, the generated parity, and padding data. Thereafter, the tag management unit 28 performs an operation of writing the generated index IND to the host memory 5. As a result, the cache tag body is updated.

The tag management unit 28 sets (updates) the target bit of the bitmap to "1" (S107). Steps S106 and S107 may be performed at the same time, or the order may be reversed.

Meanwhile, when the target bit is "1" ("Yes" in S103), the tag management unit 28 reads the cache tag body from the host memory 5 (S108). More specifically, the tag management unit 28 reads the target index IND from the host memory 5.

The tag management unit 28 performs an analysis operation of the target tag data (S109). More specifically, the ECC circuit 26 performs the ECC process (decoding process) of the target index IND. The tag management unit 28 performs the analysis operation of the target tag data using the target index IND after the ECC process.

The tag management unit 28 updates the cache tag body based on the analysis of the target tag data included in the target index IND (S110). For example, as a result of the analysis, the tag management unit 28 may update both the tag data and the header of one or more ways WY in the target index IND, in the same manner as in S106. Further, as a result of the analysis, when it is not necessary to update the tag data, the tag management unit 28 updates only the history data of the corresponding header. The ECC circuit 26 generates the parity corresponding to the index IND. The tag management unit 28 generates the index IND including the plurality of updated ways WY, the generated parity, and padding data. Thereafter, the tag management unit 28 performs an operation of writing the generated index IND to the host memory 5. As a result, the cache tag body is updated.

1.5 Effect According to Present Embodiment

With the configuration according to the present embodiment, the start-up time of the memory system can be shortened. The effect resulting therefrom will be described in detail.

For example, the cache tag stored in the host memory immediately after power is supplied to the memory system contains an indefinite value. Therefore, the memory system performs the initialization of the cache tag as one of the start-up operations. Among the communication bands usable on the host bus, the bands that may be used to send and receive the cache tag are often limited. Thus, for example, even when data is transferred from the memory system to the host memory using a DMAC, it is difficult to shorten the time required for initializing the cache tag. Therefore, the initialization of the cache tag tends to increase the start-up time of the memory system.

In the configuration according to the present embodiment, the memory system 3 includes a bitmap indicating whether the cache tag stored in the host memory 5 has been referred to after power was last supplied to the memory system 3, and a cache tag initial value. Based on the bitmap, when the target index IND has not been referred to after the power was last supplied, the memory system 3 may use the preset cache tag initial value as the index IND. Therefore, the memory system 3 may omit the initialization of the cache tag at the time of the start-up operation. Further, 1-bit data of the bitmap is assigned to one index IND of the cache tag. The amount of data in the bitmap is less than the amount of data in the cache tag. Therefore, bitmap initialization can reduce the amount of data compared to cache tag initialization. Further, since the bitmap initialization does not use the host bus to communicate with the host memory 5, it is not affected by the limitation of the communication band. Therefore, the start-up time of the memory system 3 can be shortened.

In the configuration according to the present embodiment, when the target bit of the bitmap is "0", since the cache tag initial value is used, the memory system 3 may omit the operation of reading the cache tag from the host memory 5. Therefore, the memory system 3 can shorten the time for updating the cache tag.

1.6 Modifications

Next, two modifications of the first embodiment will be described.

1.6.1 First Modification

First, with reference to FIG. 7, descriptions will be made for a first modification of the first embodiment. In the first modification, descriptions will be made for a flow of the cache tag update process different from that of the first embodiment. FIG. 7 is a flow chart of the cache tag update process. Hereinafter, the points different from those of the first embodiment will be mainly described.

As illustrated in FIG. 7, after determining the target index IND (S101), the tag management unit 28 determines whether all bits of the bitmap are "1" (S120).

When it is determined that all bits are not "1" ("No" in S120), that is, when the bitmap includes "0", the tag management unit 28 performs the same processes of S102 to S110 as those of the first embodiment described with reference to FIG. 6.

When it is determined that all bits are "1" ("Yes" in S120), the tag management unit 28 performs the processes of S108 to S110. When it is determined that all bits are "1", that is, after the update of all indexes IND is completed, the tag management unit 28 may omit the operation of checking the target bit.

1.6.2 Second Modification

Next, a second modification of the first embodiment will be described with reference to FIG. 8. In the second modification, descriptions will be made for a case where 1-bit data of the bitmap corresponds to a plurality of indexes IND. FIG. 8 is a diagram illustrating the configuration of a cache tag and a bitmap. Hereinafter, the points different from those of the first embodiment will be mainly described.

As illustrated in FIG. 8, an index group IG including k indexes IND (k is an integer of 1 or more and m or less) is configured in the second modification. The cache tag includes (m/k) index groups IG0 to IG(m/k−1). The number of indexes IND included in each index group IG may be different.

In the bitmap of the present embodiment, 1-bit data is assigned to one index group IG. Therefore, the bitmap has (m/k) bits of data.

The tag management unit 28 performs the cache tag update process for each index group IG. For example, the tag management unit 28 updates the cache tag body in the same procedure as in the first embodiment or the first modification of the first embodiment. At this time, the tag management unit 28 writes the updated data in the update target index IND of the index group IG, and writes the cache tag initial value in the non-target index IND of the index group IG.

1.6.3 Effect According to Modifications

With the configurations according to the first and second modifications, the same effect as that of the first embodiment can be obtained.

Further, in the case of the configuration according to the first modification, after all bits of the bitmap become "1" after power has been supplied, that is, after all indexes IND are updated, a reference operation of the bitmap may be omitted. Therefore, the cache tag update process can be simplified.

Further, in the configuration according to the second modification, 1-bit data of the bitmap may be assigned to an index group IG (a plurality of indexes IND). Therefore, the number of bits in the bitmap may be reduced as compared with the case where 1-bit data is assigned to an index IND.

By reducing the number of bits, the bitmap initialization time can be shortened. Therefore, the start-up time of the memory system 3 can be shortened.

2. Second Embodiment

Next, a second embodiment will be described. In the second embodiment, descriptions will be made for a process of updating count data stored in the host memory 5.

Hereinafter, the points different from those of the first embodiment will be mainly described. In the following description, the LUT cache, the cache tag, and the tag management unit 28 are omitted. The configuration of the tag management unit 28 may be the same as or different from that of the first embodiment.

2.1 Entire Configuration of Information Processing System

Figure 9:
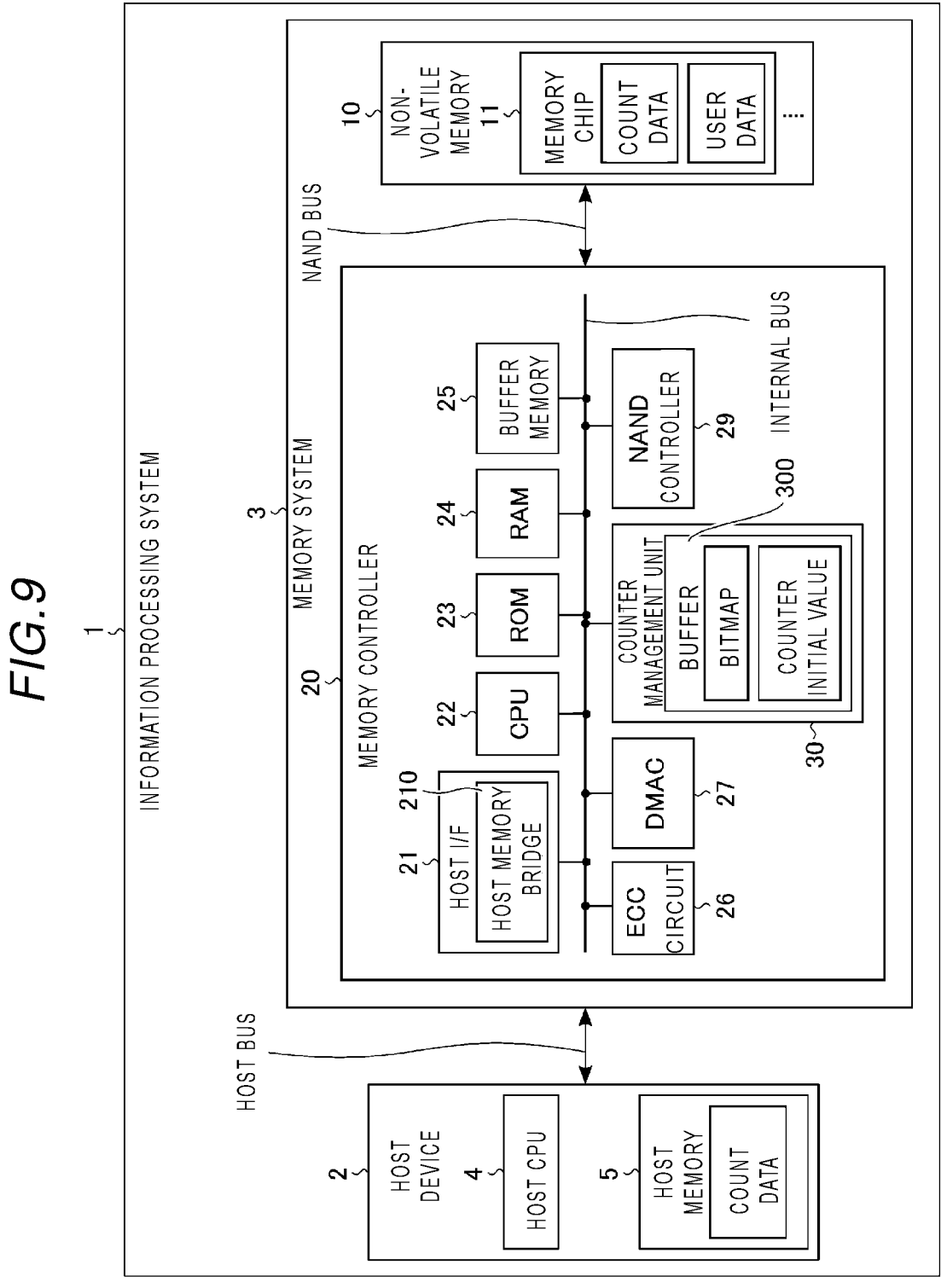
FIG. 9 is a block diagram illustrating an example of an entire configuration of an information processing system including a memory system according to a second embodiment.

First, with reference to FIG. 9, descriptions will be made for an example of the entire configuration of the information processing system 1. FIG. 9 is a block diagram illustrating an example of the entire configuration of the information processing system 1.

As illustrated in FIG. 9, the host memory 5 of the present embodiment stores count data including various count values used for management of the memory system 3. In other words, the host memory 5 includes a memory area for storing the count data which is management data. For example, the count data includes a count value of a valid cluster of each block BLK of the memory chip 11 or a count value of the number of read operations for each cell unit CU. A valid cluster is a cluster that includes valid data. The CPU 22 may refer to the count value of the valid cluster to determine a block BLK to be garbage collected. Further, when the count value of the number of read operations of a cell unit CU is equal to or more than a threshold value, the CPU 22 may perform a process such as refreshing in consideration of a read disturb to the memory cell transistor MC in the block BLK including the cell unit CU.

The memory controller 20 may store the count data from the host memory 5 into the non-volatile memory 10 at any timing. Further, the memory controller 20 may store the count data from the non-volatile memory 10 into the host memory 5 at any timing. In other words, the count data stored in the host memory 5 is cache data of the count data stored in the non-volatile memory 10.

Next, descriptions will be made for an example of the internal configuration of the memory controller 20. The memory controller 20 of the present embodiment further includes, for example, a counter management unit 30. The function of the counter management unit 30 may be implemented by a dedicated circuit or by the CPU 22 executing the firmware.

The counter management unit 30 is a circuit that manages the count data. For example, the counter management unit 30 controls an operation of reading the count data from the host memory 5 and an operation of writing the count data to the host memory 5. For example, the counter management unit 30 accesses the host memory bridge 210 and causes the host memory bridge 210 to perform a read operation and a write operation of the count data. Further, the counter management unit 30 performs a calculation (addition, subtraction, etc.) of the read count data. The counter management unit 30 writes back the calculated count data to the host memory 5 (hereinafter, also referred to as a "count data update process").

The counter management unit 30 includes a buffer 300. The buffer 300 is a volatile memory. For example, a bitmap corresponding to the count data and an initial value of the count data (counter initial value) are stored in the buffer 300. The bitmap or the counter initial value corresponding to the count data may be stored in the RAM 24.

The bitmap corresponding to the count data is a collection of a plurality of pieces of 1-bit data, each of which indicates whether the corresponding entry unit is referred to after power was last supplied to the memory system 3. The entry unit is a unit of data that is collectively processed in a read operation and a write operation of the count data. The count data includes a plurality of entry units. That is, the plurality of entry units are stored in the host memory 5. Details of the configuration of the entry unit will be described later. For example, when an entry unit is not read from the host memory 5 after power was last supplied to the memory system 3, that is, when the entry unit has not been referred to, the counter management unit 30 sets the corresponding bit of the bitmap to "0" data. Meanwhile, when an entry unit has been read from the host memory 5 after power was last supplied to the memory system 3, that is, when the entry unit has been referred to, the counter management unit 30 sets the corresponding bit of the bitmap to "1" data.

The entry unit includes a plurality of entries. The entry may include one or more count values. For example, one entry may include count values of valid clusters of a plurality of blocks BLK.

When the corresponding bit of the bitmap is "0", the counter initial value is an initial value used by the counter management unit 30. When a bit of the bitmap is "0", the counter management unit 30 does not read the corresponding entry unit from the host memory 5 when referring to (reading) the entry unit, and reads the counter initial value stored in the buffer 300. Meanwhile, when a bit of the bitmap is "1", the counter management unit 30 reads the corresponding entry unit from the host memory 5. The counter management unit 30 manages the counter initial value. The counter management unit 30 may have a plurality of counter initial values. For example, the counter management unit 30 may select one of the plurality of counter initial values based on the contents of the entry.

2.2 Configuration of Count Data and Bitmap

Figure 10:
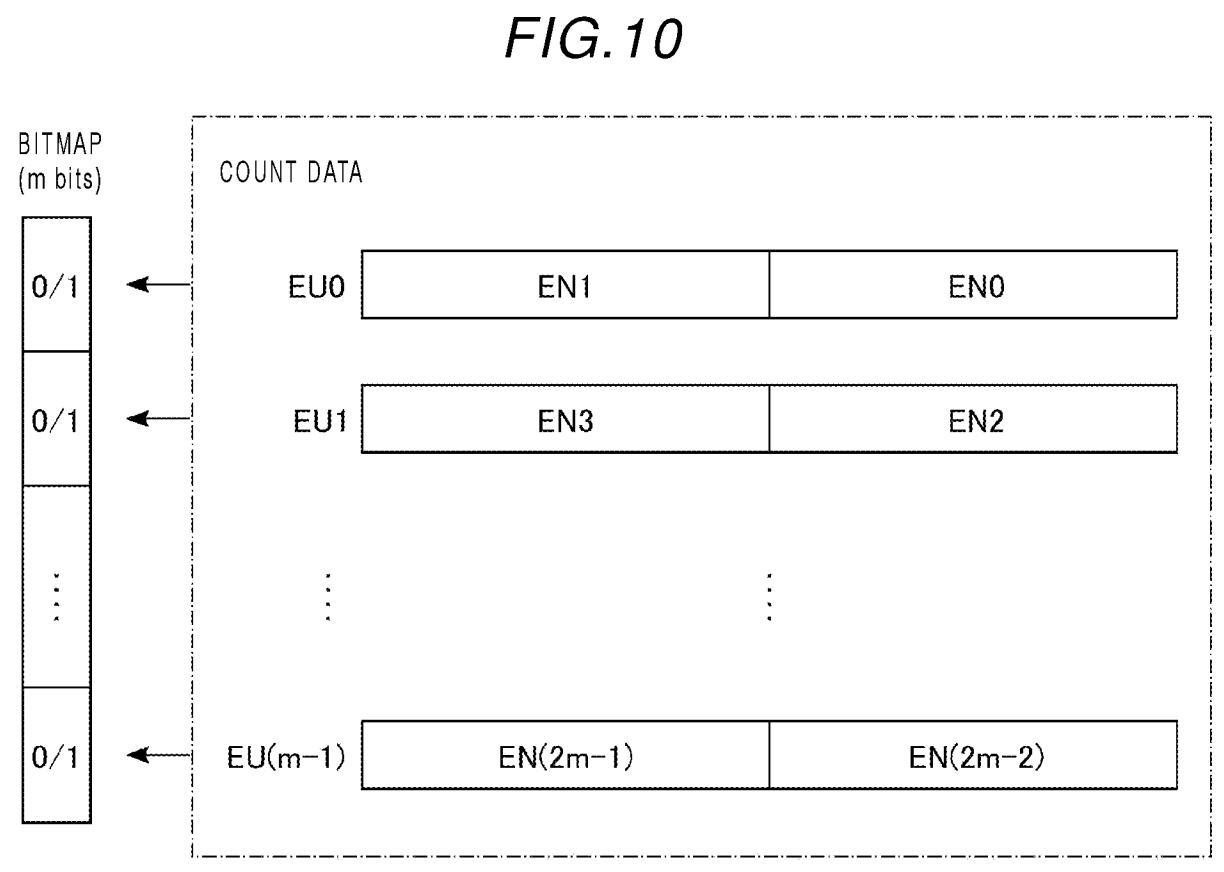

Next, with reference to FIG. 10, descriptions will be made for an example of the configuration of the count data and the bitmap. FIG. 10 is a diagram illustrating the configuration of the count data and the bitmap.

As illustrated in FIG. 10, the count data stored in the host memory 5 includes a plurality of entry units EU. In the example illustrated in FIG. 10, the count data includes m entry units EU0 to EU(m−1) (m is an integer of 1 or more).

The entry unit EU includes a plurality of entries EN. In the example illustrated in FIG. 10, each entry unit EU includes two entries EN. Therefore, 2m entries EN0 to EN(2m−1) are stored in the host memory 5. The data length of each entry EN may be different depending on the content to be counted. In this case, the number of entries EN included in each entry unit EU may be different.

In the bitmap of the present embodiment, 1-bit data is assigned to one entry unit EU. Therefore, the bitmap has m-bit data.

2.3 Initialization Operation of Counter Management Unit after Supplying Power Next, with reference to FIG. 11, descriptions will be made for an example of the initialization operation of the counter management unit 30 after power is supplied to the memory system 3. FIG. 11 is a flow chart of the initialization operation of the counter management unit 30.

As illustrated in FIG. 11, power is supplied to the memory system 3 (S1). As a result, the memory controller 20 starts the start-up operation. The memory controller 20 performs the initialization operation of the counter management unit 30 as one of the start-up operations.

The counter management unit 30 sets the counter initial value used for each entry unit EU (S21). Note that, the counter initial value of each entry unit EU may be the same or may be different for each entry unit EU. Further, the counter initial value may be set per entry unit EU or per entry EN.

The counter management unit 30 initializes all bits of the bitmap stored in the buffer 300 to "0" (S22). Steps S21 and S22 may be performed at the same time, or the order may be reversed.

As a result, the initialization operation of the counter management unit 30 ends (S23). The memory controller 20 does not initialize the count data in the host memory 5 in the start-up operation.

2.4 Count Data Update Process

Figure 12:
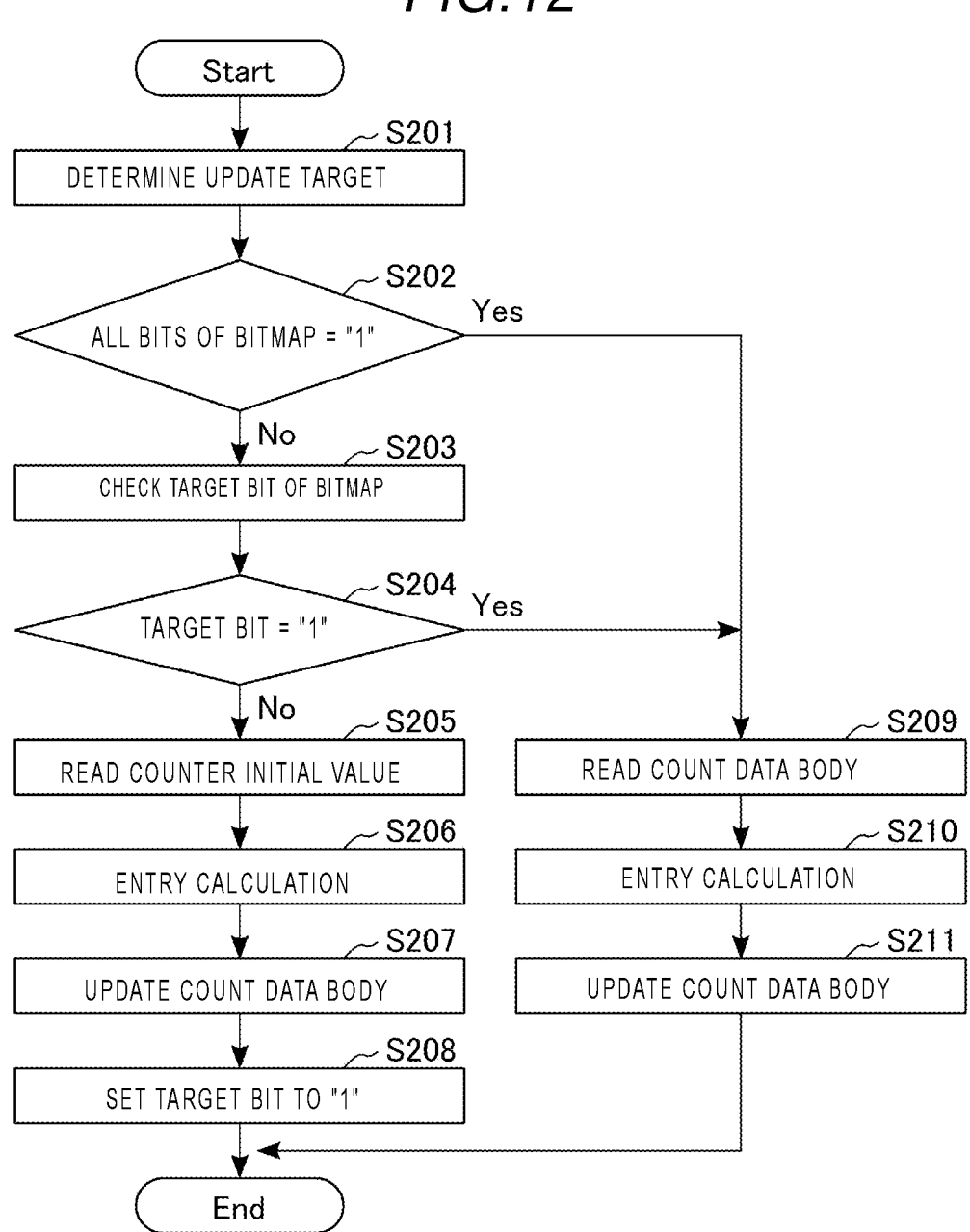
FIG. 12 is a flow chart of a count data update process in the memory system according to the second embodiment.

Next, with reference to FIGS. 12 and 13, descriptions will be made for an example of the count data update process, which is triggered after the initialization operation of FIG. 11, e.g., when a read operation is executed. FIG. 12 is a flow chart of the count data update process. FIG. 13 is a diagram illustrating an example of a data configuration of the entry unit EU. The example of FIG. 13 illustrates the data configuration when an entry EN1 is the update target and the target bit of the bitmap is "0".

As illustrated in FIG. 12, the counter management unit 30 first determines an entry unit EU (target entry unit EU) including an entry EN (target entry EN) that is a target of the count data update process (S201). The target entry unit EU is determined, for example, from upper bits of the identifier (e.g., physical address) of a cell unit CU which is the target of the read operation.

The counter management unit 30 determines whether all bits of the bitmap are "1" (S202).

When it is determined that all bits are not "1" ("No" in S202), that is, when "0" is included in the bitmap, the counter management unit 30 checks a bit (target bit) of the bitmap which bit corresponds to the target entry unit EU (S203).

When it is determined that the target bit is not "1" ("No" in S204), that is, when the target bit is "0", the counter management unit 30 reads the counter initial value from the buffer 300 (S205). As illustrated in FIG. 13, the counter management unit 30 sets the counter initial values for the entries EN0 and EN1.

The counter management unit 30 performs a calculation (analysis) of the target entry EN using the counter initial value (S206). As illustrated in FIG. 13, for example, the counter management unit 30 performs a calculation process (e.g., count-up of the count value) from the counter initial value for the entry EN1. The counter management unit 30 sets the calculated value in the entry EN1 as a result of the calculation.

The counter management unit 30 updates the count data stored in the host memory 5 (hereinafter, also referred to as a "count data body") based on the result of the calculation (analysis) of the target entry EN (counter initial value) (S207). For example, as illustrated in FIG. 13, the counter management unit 30 writes the counter initial value to the entry EN0 and the calculated value to the entry EN1, of the entry unit EU0. As a result, the count data body is updated.

The counter management unit 30 sets (updates) the target bit of the bitmap to "1" (S208). Steps S207 and S208 may be performed at the same time, or the order may be reversed.

When it is determined that all bits are "1" ("Yes" in S202) or the target bit is "1" ("Yes" in S204), the counter management unit 30 reads the count data body, that is, the entry unit EU including the target entry EN from the host memory 5 (S209).

Similar to steps S206 and S207, the counter management unit 30 performs the calculation of the target entry EN (S210) and the update of the count data body (S211).

2.5 Effect According to Present Embodiment

In the configuration according to the present embodiment, the memory system 3 includes, a bitmap indicating whether the count data stored in the host memory 5 has been referred to after power was last supplied to the memory system 3, and a counter initial value. Based on the bitmap, when the target entry unit EU has not been referred to after power was last supplied, the memory system 3 may use the preset counter initial value as the entry EN. Therefore, the memory system 3 may omit the initialization of the count data at the time of the start-up operation. Further, as in the first embodiment, the initialization of the bitmap can reduce the amount of data as compared with the initialization of the count data. Since the bitmap initialization does not use the host bus to communicate with the host memory 5, it is not affected by the limitation of the communication band. Therefore, the start-up time of the memory system 3 can be shortened.

Further, in the configuration according to the present embodiment, when the target bit of the bitmap is "0", since the counter initial value is used, the memory system 3 may omit the operation of reading the count data from the host memory 5. Therefore, the memory system 3 can shorten the time for updating the count data.

2.6 Modifications

Next, a modification of the second embodiment will be described. In the modification of the second embodiment, descriptions will be made for a case where 1-bit data of the bitmap corresponds to a plurality of entry units EU. Hereinafter, the points different from the second embodiment will be mainly described.

2.6.1 Configuration of Count Data and Bitmap

Figure 14:
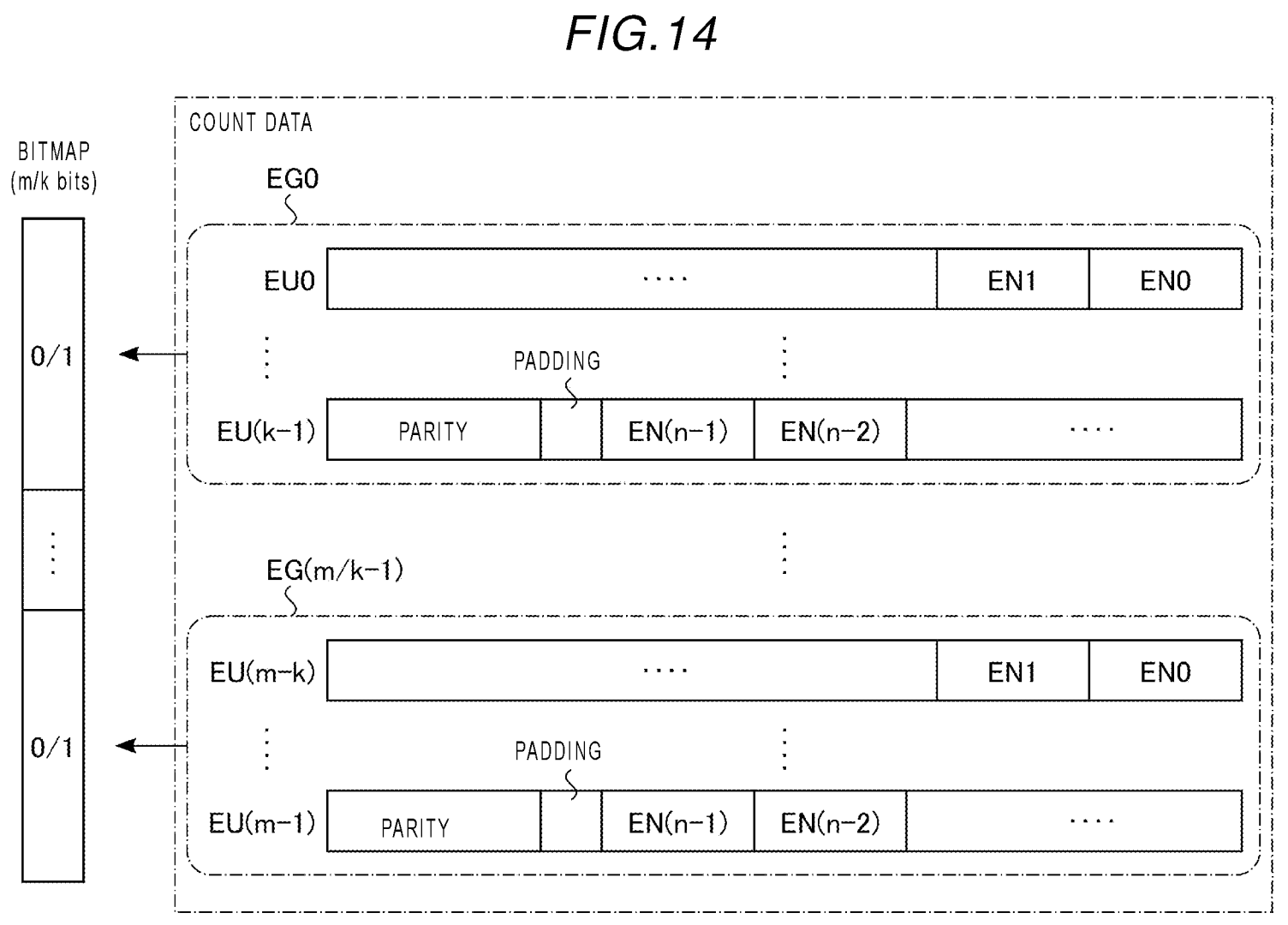

First, with reference to FIG. 14, descriptions will be made for an example of the configuration of the count data and the bitmap. FIG. 14 is a diagram illustrating the configuration of the count data and the bitmap.

As illustrated in FIG. 14, a plurality of entry groups EGs each including k entry units EU are configured in the modification. The count data includes (m/k) entry groups EG0 to EG(m/k−1).

One entry group EG includes n entries EN0 to EN(n−1), parity, and padding data. The parity is generated based on a plurality of entries EN in the entry group EG. Therefore, the entry group EG is a unit of data processing in the ECC process. The counter management unit 30 performs the count data update process for each entry group EG.

The number of entry units EU and entries EN included in each entry group EG may be different. The data of one entry EN may be divided and stored in a plurality of entry units EU. The parity may be assigned to each entry unit EU, or the parity may not be assigned to the entry group EG. Also, the entry group EG may not include the padding data.

In the bitmap of the present embodiment, 1-bit data is assigned to one entry group EG. Therefore, the bitmap has (m/k) bits of data.

2.6.2 Count Data Update Process

Next, with reference to FIG. 15, descriptions will be made for an example of the data configuration in the count data update process. FIG. 15 is a diagram illustrating an example of data update of the entry group EG. The example of FIG. 15 illustrates a data configuration when an entry EN1 is the update target and the target bit of the bitmap is "0".

The flow of the count data update process in the present modification is the same as that of the second embodiment. As illustrated in FIG. 15, for example, when the target bit is "0", the counter management unit 30 reads the counter initial value from the buffer 300. At this time, for example, the counter initial value is all "0".

The counter management unit 30 performs a calculation (analysis) of the target entry EN using the counter initial value. As a result, the counter management unit 30 sets the calculated value in the entry EN1. The ECC circuit 26 performs the ECC process (encoding process) to generate parity corresponding to n entries EN0 to EN(n−1). The counter management unit 30 generates an entry group EG (a plurality of entry units EU) including n entries EN0 to EN(n−1), padding data, and the generated parity.

The counter management unit 30 uses the generated entry group EG to update the count data (count data body) stored in the host memory 5.

Thereafter, the counter management unit 30 sets (updates) the target bit to "1".

2.6.3 Effect According to Modifications

With the configuration according to the modification, the same effect as that of the second embodiment can be obtained.

Further, in the configuration according to the modification, 1-bit data of the bitmap may be assigned to the entry group EG (a plurality of entry units EU). Therefore, the number of bits in the bitmap may be reduced as compared with the case where 1-bit data is assigned to an entry unit EU. By reducing the number of bits, the bitmap initialization time can be shortened. Therefore, the start-up time of the memory system 3 can be shortened.

Further, in the configuration according to the modification, since the entry group EG includes parity, an erroneous reading of the count data can be prevented. Therefore, the reliability of the count data can be improved.

3. Third Embodiment

Next, a third embodiment will be described. In the third embodiment, the configuration of the memory system 3 different from that of the first embodiment will be described. Hereinafter, the points different from those of the first embodiment will be mainly described.

3.1 Entire Configuration of Information Processing System

Figure 16:
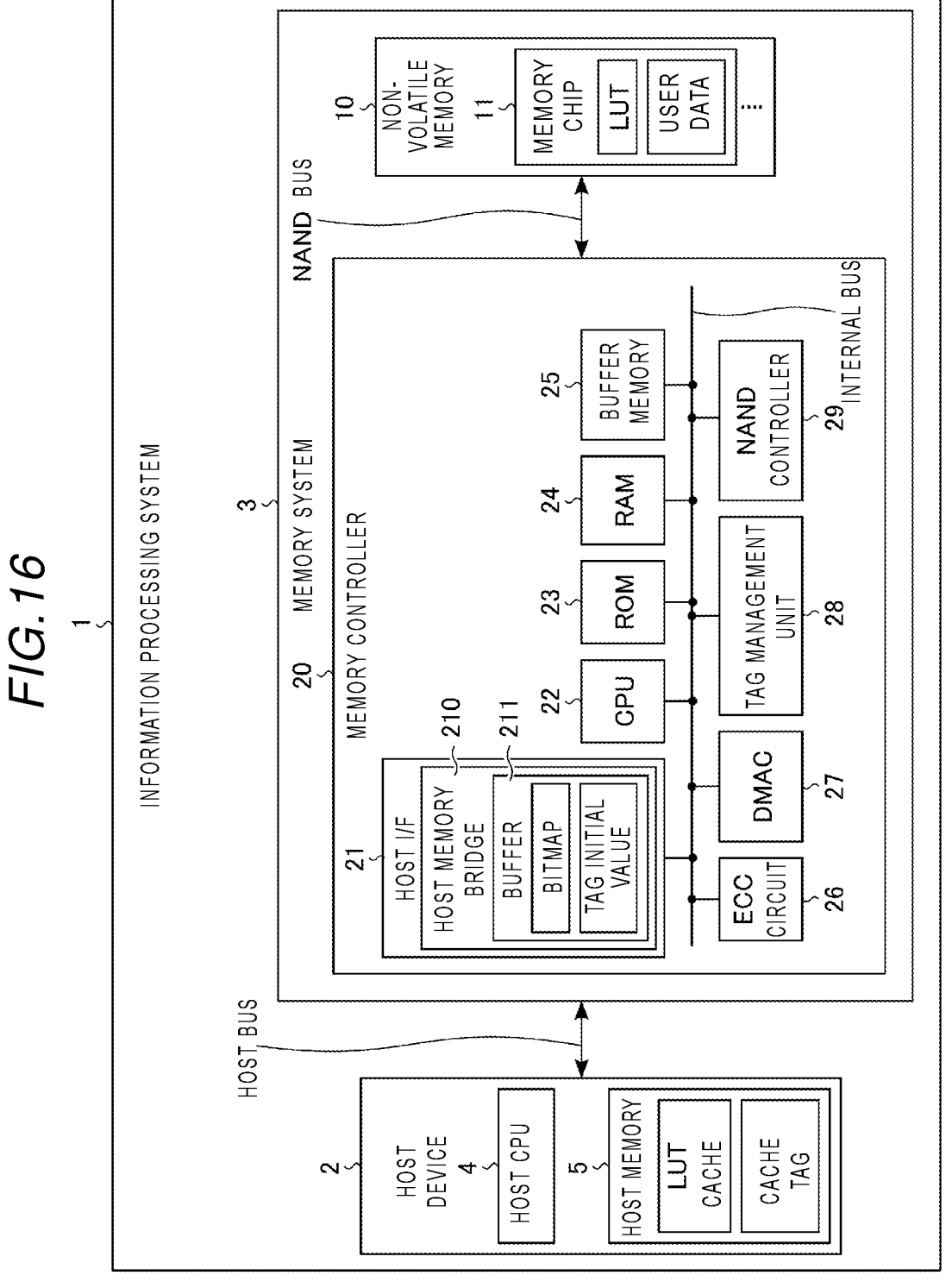
FIG. 16 is a block diagram illustrating an example of an entire configuration of an information processing system including a memory system according to a third embodiment.

First, with reference to FIG. 16, descriptions will be made for an example of the entire configuration of the information processing system 1. FIG. 16 is a block diagram illustrating an example of the entire configuration of the information processing system 1.

As illustrated in FIG. 16, the configuration of the host device 2 and the non-volatile memory 10 is the same as that of the first embodiment.

The internal configuration of the memory controller 20 will be described. The configuration other than the tag management unit 28 and the host memory bridge 210 is the same as that of the first embodiment.

In the present embodiment, the tag management unit 28 may include the buffer 280 or may not. In either case, the bitmap and the cache tag initial value are not stored in the buffer 280.

The host memory bridge 210 includes a buffer 211. The buffer 211 is a volatile memory. For example, the bitmap and the cache tag initial value are stored in the buffer 211. The bitmap or the cache tag initial value may be stored in the RAM 24. In the present embodiment, the host memory bridge 210 manages the bitmap and the cache tag initial value.

For example, when the host memory bridge 210 receives a cache tag read instruction from the tag management unit 28, the host memory bridge 210 checks a bit of the bitmap corresponding to the index IND of the address designated by the read instruction. Then, when it is determined that the bit is "0", the host memory bridge 210 transmits the cache tag initial value to the tag management unit 28. Meanwhile, when it is determined that the bit is "1", the host memory bridge 210 reads the index IND from the host memory 5. Then, the host memory bridge 210 transmits the index IND (cache tag) read from the host memory 5 to the tag management unit 28.

3.2 Initialization Operation of Host Memory Bridge after Supplying Power

Next, with reference to FIG. 17, descriptions will be made for an example of the initialization operation of the host memory bridge 210 after power is supplied to the memory system 3. FIG. 17 is a flow chart of the initialization operation of the host memory bridge 210.

As illustrated in FIG. 17, power is supplied to the memory system 3 (S1). As a result, the memory controller 20 starts start-up operations. The memory controller 20 executes the initialization operation of the host memory bridge 210 as one of the start-up operations.

The host memory bridge 210 sets the cache tag initial value used for each index IND, in the same manner as in step S2 of the first embodiment described with reference to FIG. 5 (S31).

The host memory bridge 210 initializes all bits of the bitmap stored in the buffer 211 to "0" in the same manner as in step S3 of the first embodiment described with reference to FIG. 5 (S32). Steps S31 and S32 may be performed at the same time, or the order may be reversed.

As a result, the initialization operation of the host memory bridge 210 ends (S33). The memory controller 20 does not initialize the cache tag in the host memory 5 in the start-up operation.

3.3 Access Operation of Host Memory Bridge

Figure 18:
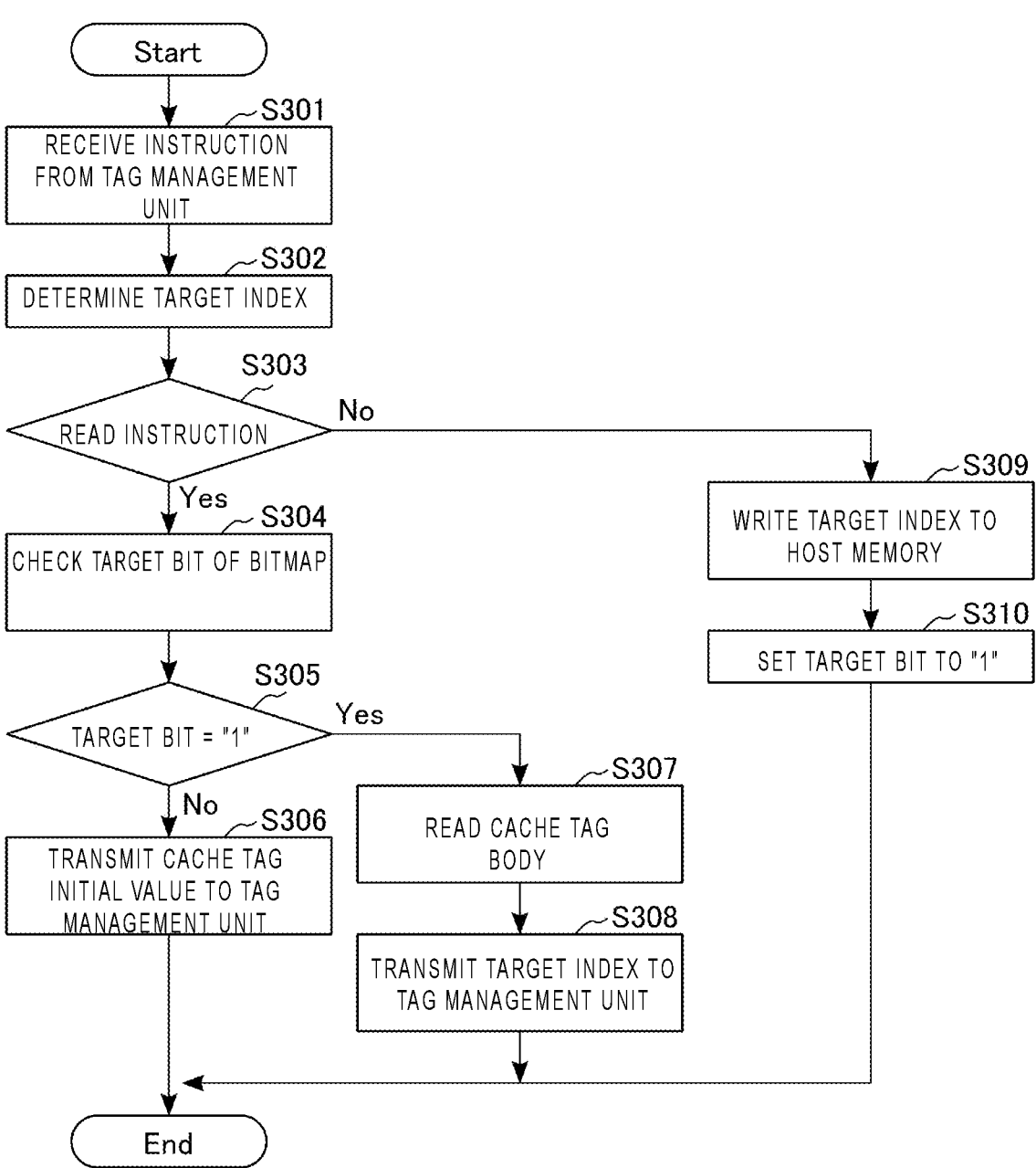
FIG. 18 is a flow chart of an access operation of the host memory bridge in the memory system according to the third embodiment.

Next, with reference to FIG. 18, descriptions will be made for an example of the access operation of the host memory bridge 210. FIG. 18 is a flow chart of the access operation of the host memory bridge 210.

As illustrated in FIG. 18, the host memory bridge 210 receives a read instruction or a write instruction of the cache tag from the tag management unit 28 (S301). More specifically, the host memory bridge 210 receives a command set instructing a read operation or a write operation from the tag management unit 28. For example, in the case of a read instruction, the command set includes a command instructing a read operation and an address corresponding to an index IND. In the case of a write instruction, the command set includes a command instructing a write operation, an address corresponding to an index IND, and data of the index IND.

The host memory bridge 210 determines an index IND (target index IND) including tag data (target tag data) to be accessed based on the address included in the instruction (S302).

When a read instruction is received from the tag management unit 28 ("Yes" in S303), the host memory bridge 210 checks a bit (target bit) of the bitmap which bit corresponds to the target index IND (S304).

When it is determined that the target bit is not "1" ("No" in S305), that is, when the target bit is "0", the host memory bridge 210 reads the cache tag initial value from the buffer 211. Then, the host memory bridge 210 transmits the cache tag initial value to the tag management unit 28 (S306).

When it is determined that the target bit is "1" ("Yes" in S305), the host memory bridge 210 reads the cache tag body from the host memory 5 (S307). More specifically, the host memory bridge 210 reads the target index IND from the host memory 5. Then, the host memory bridge 210 transmits the target index IND to the tag management unit 28 (S308).

Further, when the read request is not received from the tag management unit 28 ("No" in S303), that is, when a write request is received, the host memory bridge 210 writes the target index IND to the host memory 5 (S309).

The host memory bridge 210 sets the target bit of the bitmap corresponding to the target index IND to which the data is written to "1" (S310).

As a result, the access operation of the host memory bridge 210 ends.

3.4 Effect According to Present Embodiment

With the configuration according to the present embodiment, the same effect as that of the first embodiment can be obtained.

In the configuration according to the present embodiment, the host memory bridge 210 manages the bitmap and the cache tag initial value. Therefore, the processing load on the tag management unit 28 can be reduced.

3.5 Modifications

Next, two modifications of the third embodiment will be described. Hereinafter, the points different from the third embodiment will be mainly described.

3.5.1 First Modification

Figure 19:
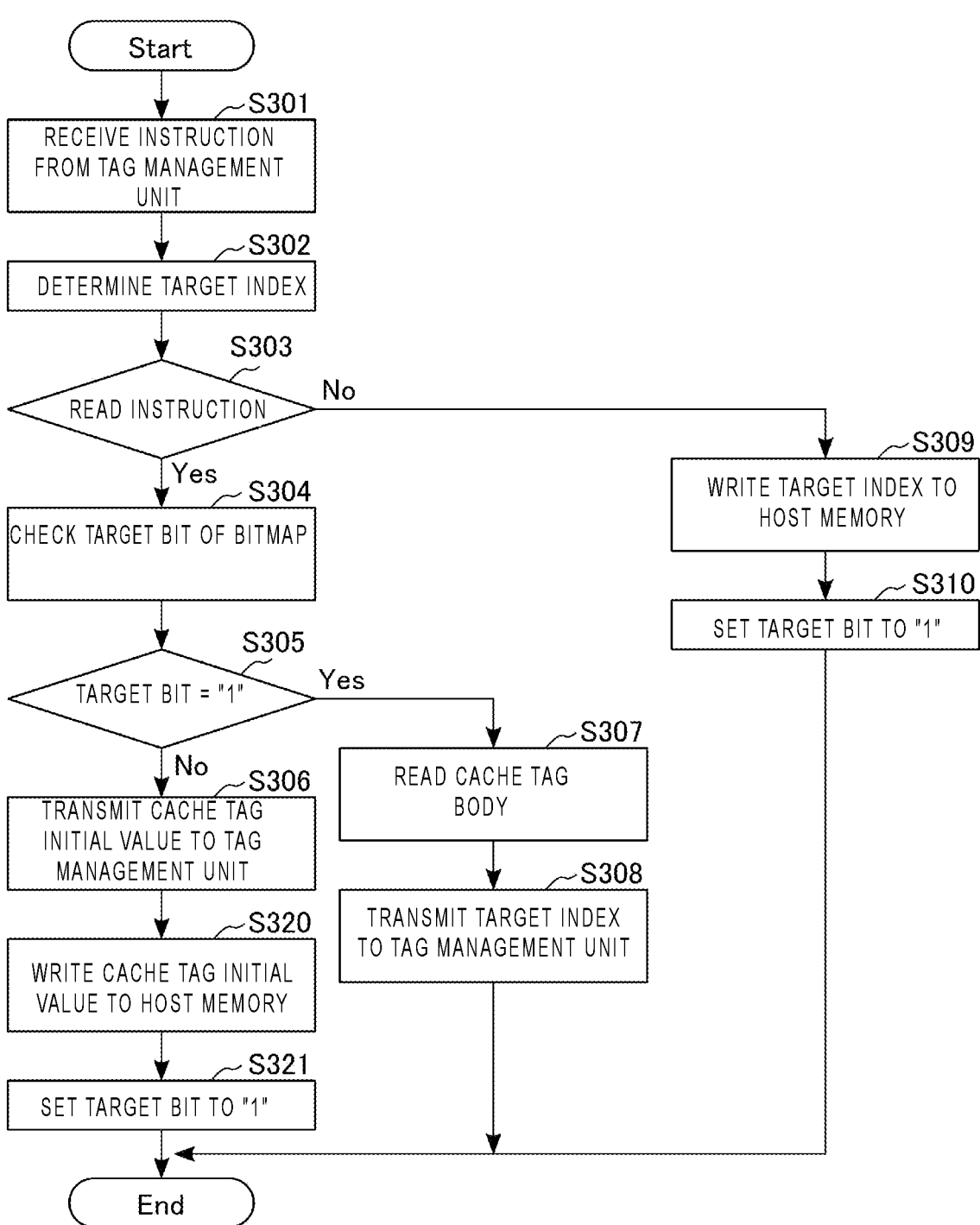
FIG. 19 is a flow chart of an access operation of a host memory bridge in a memory system according to a first modification of the third embodiment.

First, a first modification of the third embodiment will be described with reference to FIG. 19. In the first modification, descriptions will be made for the flow of the access operation of the host memory bridge 210 different from the third embodiment. FIG. 19 is a flow chart of the access operation in the host memory bridge 210.

As illustrated in FIG. 19, the host memory bridge 210 transmits the cache tag initial value to the tag management unit 28 in step S306, and then writes the cache tag initial value to the target index IND in the host memory 5 (S320). That is, even when a read instruction is received from the tag management unit 28, when the target bit is "0", the host memory bridge 210 performs the operation of writing the cache tag initial value.

The host memory bridge 210 sets the target bit of the bitmap corresponding to the index IND in which the data is written to "1" (S321).

Other processes are the same as those in FIG. 18 of the third embodiment.

3.5.2 Second Modification

Next, a second modification of the third embodiment will be described. As the second modification, the first modification of the third embodiment and the second modification of the first embodiment may be combined with each other. That is, 1-bit data of the bitmap may be assigned to one index group IG. When the operation of writing the cache tag initial value of step S320 is performed, the host memory bridge 210 writes the cache tag initial value to each index IND of the index group IG.

Further, when the target bit is "0" in the index IND writing of step S309, the host memory bridge 210 writes the cache tag initial value to the non-target index IND of the index group IG.

3.5.3 Effect According to Modifications

With the configurations according to the first and second modifications, the same effect as that of the third embodiment can be obtained.

Further, in the configuration according to the first modification, the operation of writing the cache tag initial value to the host memory 5 may be performed in the operation of reading the cache tag. That is, the cache tag (index IND) may be initialized.

Further, in the configuration according to the second modification, 1-bit data of the bitmap may be assigned to the index group IG (a plurality of indexes IND). Therefore, the number of bits in the bitmap may be reduced as compared with the case where 1-bit data is assigned an index IND. By reducing the number of bits, the bitmap initialization time can be shortened. Therefore, the start-up time of the memory system 3 can be shortened.

4. Fourth Embodiment

Next, a fourth embodiment will be described. In the fourth embodiment, descriptions will be made for a flow of the cache tag update process different from that of the first embodiment. Hereinafter, the points different from those of the first embodiment will be mainly described.

4.1 Cache Tag Update Process

Figure 20:
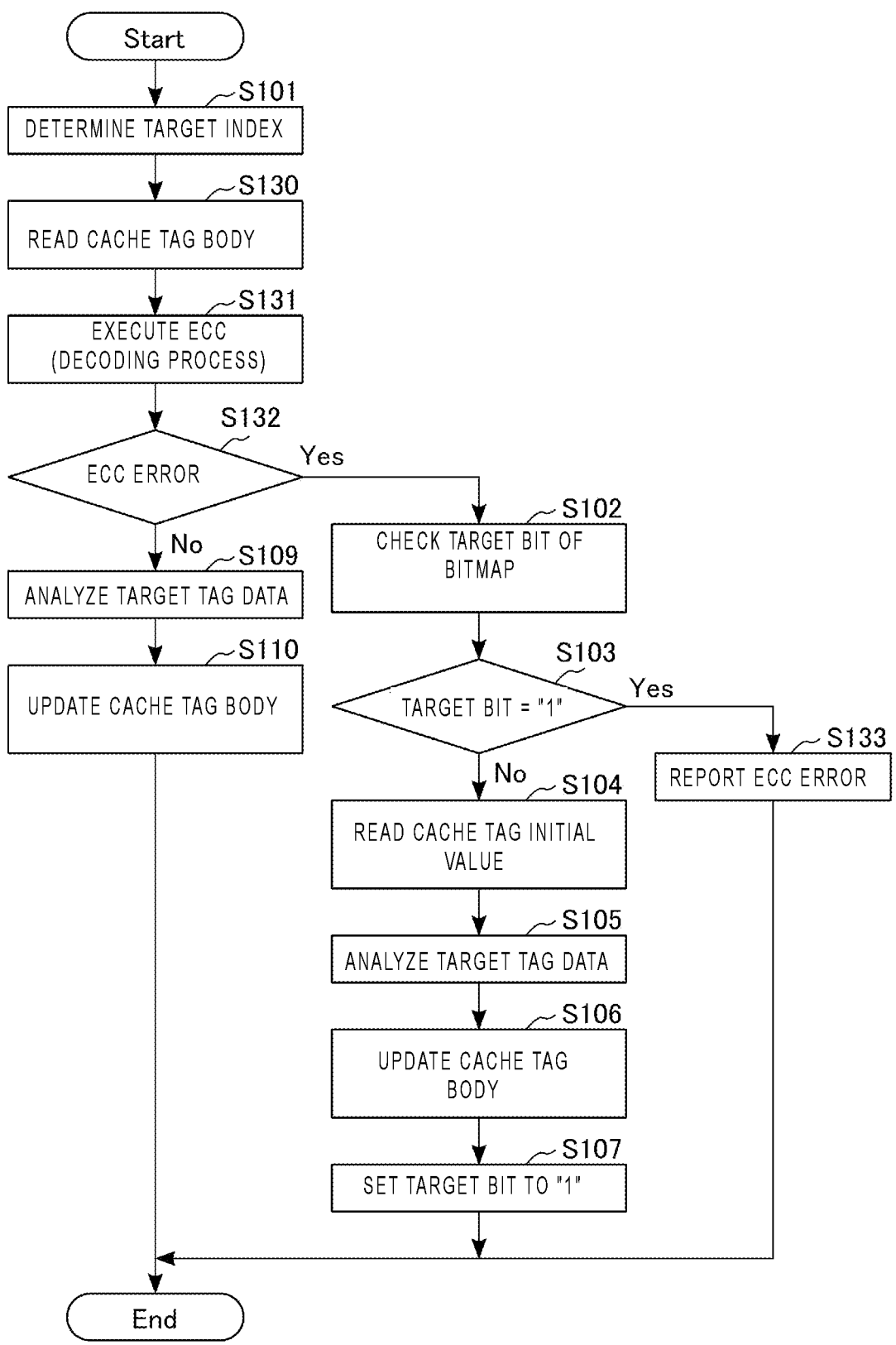
FIG. 20 is a flow chart of a cache tag update process in a memory system according to a fourth embodiment.

First, an example of the cache tag update process will be described with reference to FIG. 20. FIG. 20 is a flow chart of the cache tag update process.

As illustrated in FIG. 20, the tag management unit 28 first determines an index IND (target index IND) including tag data (target tag data) that is a target of the cache tag update process (S101).

The tag management unit 28 reads the cache tag body from the host memory 5 (S130). That is, the tag management unit 28 reads the target index IND from the host memory 5. The data of the target index IND may be an indefinite value.

The ECC circuit 26 executes the ECC process (decoding process) of the target index IND (S131). For example, when the data of the target index IND is an indefinite value, or when the number of error bits of the target index IND is larger than the number of bits that can be error-corrected, the ECC circuit 26 cannot decode (error-correct) the target index IND. Hereinafter, the case where the decoding fails is referred to as an "ECC error".

When the ECC process is completed correctly, that is, when the result of the ECC process is not an ECC error ("No" in S132), the tag management unit 28 performs the processes of steps S109 and S110 described with reference to FIG. 6. As a result, the cache tag body is updated.

Meanwhile, when the result of the ECC process is an ECC error ("Yes" in S132), the tag management unit 28 checks the target bit of the bitmap (S102).

When it is determined that the target bit is not "1" ("No" in S103), that is, when the target bit is "0", the tag management unit 28 performs the processes of steps S104 to S107 described with reference to FIG. 6. As a result, the cache tag body is updated. Further, the target bit of the bitmap is set to "1".

When it is determined that the target bit is "1" ("Yes" in S103), for example, the tag management unit 28 reports the ECC error to the CPU 22 and ends the cache tag update process.

4.2 Effect According to Present Embodiment

With the configuration according to the present embodiment, the same effect as that of the first embodiment may be obtained.

Further, in the configuration according to the present embodiment, the tag management unit 28 may perform the read operation of the cache tag body without checking the target bit of the bitmap in the cache tag update process. The tag management unit 28 checks the target bit of the bitmap when the ECC error occurs. Therefore, when no ECC error occurs, that is, when the target index IND is updated and the target index IND has a correctable value, the referring of the bitmap can be omitted. This can simplify the cache tag update process.

4.3 Modifications

Next, a modification of the fourth embodiment will be described. In the modification of the fourth embodiment, descriptions will be made for a case where the present embodiment is applied to the modification of the second embodiment. Hereinafter, the points different from the second and fourth embodiments will be mainly described.

4.3.1 Count Data Update Process

Figure 21:
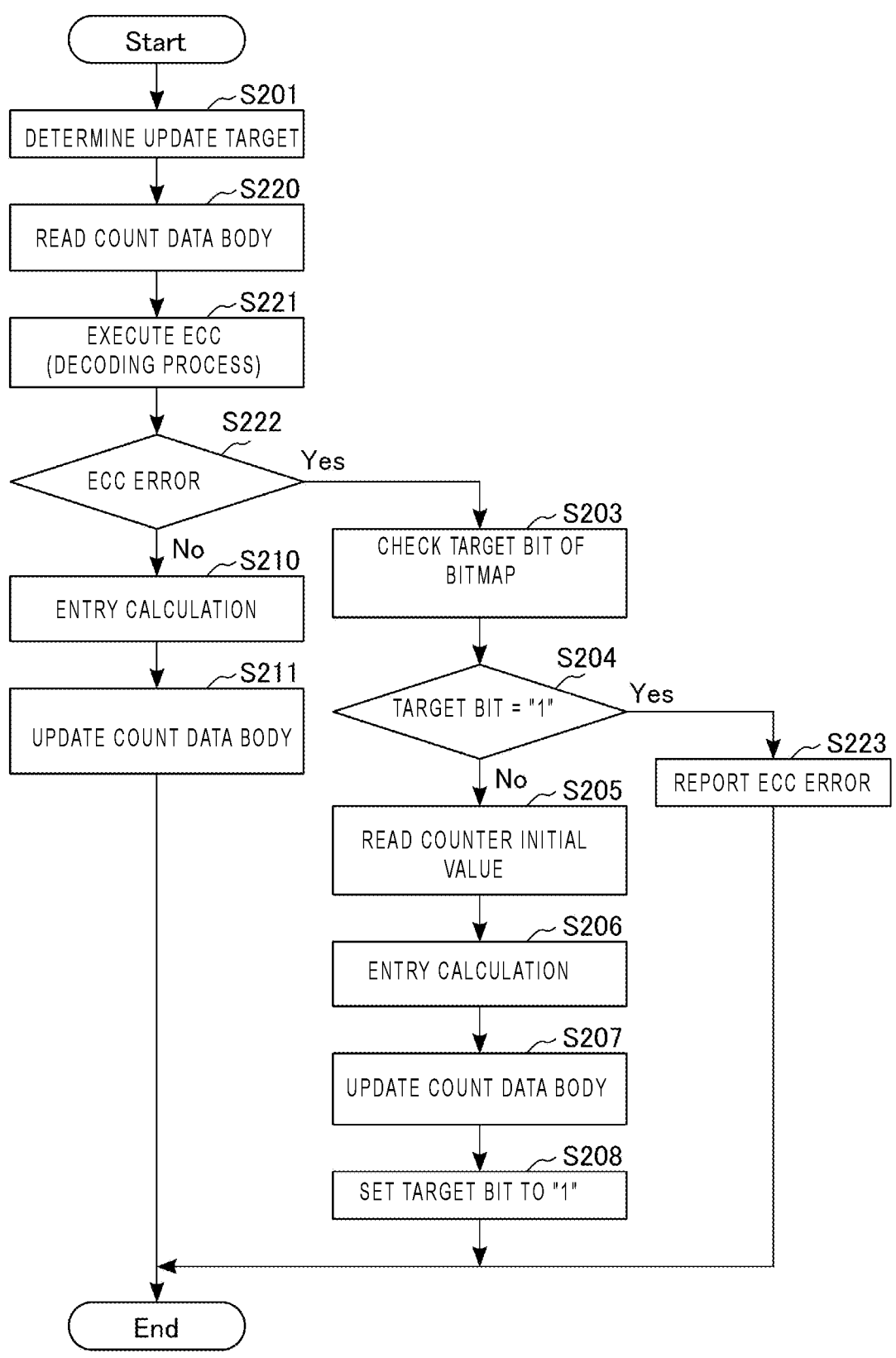
FIG. 21 is a flow chart of a count data update process in a memory system according to a modification of the fourth embodiment.

With reference to FIG. 21, descriptions will be made for an example of the count data update process. FIG. 21 is a flow chart of the count data update process.

As illustrated in FIG. 21, the counter management unit 30 first determines an entry group EG (target entry group EG) including an entry EN (target entry EN) that is a target of the count data update process (S201).

The counter management unit 30 reads the count data body from the host memory 5 (S220). That is, the counter management unit 30 reads the target entry group EG from the host memory 5. The data of the target entry group EG may be an indefinite value.

The ECC circuit 26 performs the ECC process (decoding process) of the target entry group EG (S221). For example, when the data of the target entry group EG is an indefinite value, or when the number of error bits of the target entry group EG is larger than the number of bits that can be error-corrected, the ECC circuit 26 cannot decode (error-correct) the entry group EG.

When the ECC process is completed normally, that is, when the result of the ECC process is not an ECC error ("No" in S222), the counter management unit 30 performs the processes of S210 and S211 described with reference to FIG. 12. As a result, the count data body is updated.

Meanwhile, when the result of the ECC process is the ECC error ("Yes" in S222), the counter management unit 30 checks the target bit of the bitmap (S203).

When the target bit is not "1" ("No" in S204), that is, when the target bit is "0", the counter management unit 30 performs the processes of S205 to S208 described with reference to FIG. 12. As a result, the count data body is updated. Further, the target bit of the bitmap is set to "1".

When the target bit is "1" ("Yes" in S204), for example, the counter management unit 30 reports the ECC error to the CPU 22 and ends the count data update process.

4.3.2 Effect According to Modifications

With the configuration according to the modification, the same effect as that of the second modification of the second embodiment can be obtained.

Further, in the configuration according to the modification, the counter management unit 30 may perform the operation of reading the count data body without checking the target bit of the bitmap in the count data update process. The counter management unit 30 checks the target bit of the bitmap when the ECC error occurs.

Therefore, when no ECC error occurs, that is, when the target entry group EG is updated and the target entry group EG has a correctable value, the referring of the bitmap can be omitted. This can simplify the process of updating the count data.

5. Modifications, Etc

The memory system according to the above-described embodiments is a memory system that may be connected to the host device 2 having the host memory 5, and includes: the non-volatile memory 10 configured to store management data (LUT or count data); the memory controller 20 configured to manage caching of parts of management data (a way or entry or an index or entry unit) in cache lines of the host memory; and a first memory (e.g., the buffer memory 25) configured to store a bitmap that includes a bit indicating whether the memory controller has accessed first data stored in the host memory after power was last supplied to the memory system. The first data indicates whether or not a part of the management data corresponding thereto is stored in one of the cache lines. The memory controller performs either a first operation of reading the first data from the host memory (S108) or a second operation of reading an initial value of the first data managed by the memory controller (S104) based on the bitmap.

According to the above-described embodiments, it is possible to provide a memory system with a shortened start-up time.

The embodiments are not limited to those described above, and various modifications are possible. Further, the above-mentioned embodiments may be combined as much as possible.

For example, the second embodiment and the third embodiment may be combined with each other. In this case, the host memory bridge 210 manages the bitmap of the count data and the count data initial value.

Further, the term "connect" in the above-mentioned embodiments also includes a state in which a certain component such as a transistor or a resistor is interposed between components to be indirectly connected.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A memory system connectable to a host having a host memory, the memory system comprising:
a non-volatile memory configured to store management data; and
a memory controller including a first memory and configured to:
manage caching of parts of the management data in cache lines of the host memory; and
store, in the first memory, a bitmap that includes a plurality of bits, each indicating whether the memory controller has stored first data corresponding thereto in the host memory after power was last supplied to the memory system, the host memory being a memory which is external to the memory system and stores data having indefinite value in each of memory locations of the first data before the memory system stores the first data thereat, wherein
each of the first data indicates whether or not a part of the management data corresponding thereto is stored in one of the cache lines, and
the memory controller is further configured to read a bit of the bitmap corresponding to a target memory location in the host memory and perform a first operation if a value of the bit is a first value, and perform a second operation if the value of the bit is a second value different from the first value, wherein
in the first operation, the memory controller reads the first data corresponding to the bit from the host memory, analyzes the read first data, updates the first data based on the analysis of the read first data, and stores the updated first data in the host memory, and
in the second operation, the memory controller, without reading any of the first data from the host memory, reads second data from the first memory, which is inside of the memory system, analyzes the read second data, generates the first data corresponding to the bit based on the analysis of the read second data, stores the generated first data in the host memory, and changes the value of the bit to the first value.

2. The memory system according to claim 1, wherein the memory controller is configured to initialize the bitmap stored in the first memory and not initialize the first data stored in the host memory as part of a start-up operation of the memory system.

3. The memory system according to claim 1, wherein
one of the first data is stored in the host memory and associated with an index that is also associated with third data that is stored in the host memory and indicates whether or not another part of the management data corresponding thereto is stored in one of the cache lines, and
the bit corresponding to the first data is associated with the index and has the second value if the memory controller has stored either the first data or the third data in the host memory after power was last supplied to the memory system.

4. The memory system according to claim 1, wherein
the memory controller further includes a first circuit for managing the first data and a second circuit for controlling an access to the host memory, and
when the second circuit receives from the first circuit an instruction to read the first data, the second circuit transmits either the first data stored in the host memory or the second data stored in the first memory to the first circuit, based on the bitmap.

5. The memory system according to claim 4, wherein
the second circuit transmits the first data stored in the host memory to the first circuit if the bit corresponding thereto has the first value, and the second circuit transmits the second data stored in the first memory to the first circuit if the bit has the second value.

6. The memory system according to claim 1, wherein
the memory controller is configured to execute a read operation of the first data from the host memory; and
when a decoding process fails in an error correction process of the first data read from the host memory, the memory controller reports an error if the bit corresponding to the read first data has the first value and performs the second operation if the bit has the second value.

7. The memory system according to claim 1, wherein the management data is a look-up table used in converting logical addresses to physical addresses.

8. The memory system according to claim 1, wherein the management data is count data that indicates the number of read operations performed on different groups of memory cells of the non-volatile memory or the number of valid clusters in different blocks of memory cells of the non-volatile memory.

9. A method of managing a host memory of a host from a memory system after the memory system connected to the host is powered on, the host memory including cache lines in which parts of management data stored in a non-volatile memory of the memory system are stored and a plurality of first data for managing the cache lines, each of the first data indicating whether or not a part of the management data corresponding thereto is stored in one of the cache lines, the memory system including the non-volatile memory storing the management data and a volatile memory, said method comprising:
storing, in the volatile memory of the memory system, a bitmap that includes a plurality of bits, each indicating whether the memory system has stored first data corresponding thereto in the host memory after power was last supplied to the memory system, the host memory being a memory which is external to the memory system and stores data having indefinite value in each of memory locations of the first data before the memory system stores the first data thereat;

reading a bit from the bitmap corresponding to a target memory location in the host memory and performing a first operation if a value of the bit is a first value and a second operation if the value of the bit is a second value different from the first value;

in the first operation, reading the first data corresponding to the bit from the host memory, analyzing the read first data, updating the first data based on the analysis of the read first data, and storing the updated first data in the host memory; and in the second operation, without reading any of the first data from the host memory, reading second data from the volatile memory, which is inside of the memory system, analyzing the read second data, generating the first data based on the analysis of the read second data, storing the generated first data in the host memory, and changing the value of the bit to the first value.

10. The method according to claim 9, further comprising:

as part of a start-up operation of the memory system, initializing the bitmap stored in the volatile memory and not initializing the first data stored in the host memory.

11. The method according to claim 9, wherein:

one of the tag data is stored in the host memory and associated with an index that is also associated with third data that is stored in the host memory and indicates whether or not another part of the management data corresponding thereto is stored in one of the cache lines; and the bit corresponding to the first data is associated with the index and has the second value if the memory system has stored either the first data or the third data in the host memory after power was last supplied to the memory system.

12. The method according to claim 9, wherein the memory system further includes a first circuit for managing the first data and a second circuit for controlling an access to the host memory, and when the second circuit receives from the first circuit an instruction to read the first data, the second circuit transmits either the first data stored in the host memory or the second data stored in the volatile memory to the first circuit, based on the bitmap.

13. The method according to claim 12, wherein the second circuit transmits the first data stored in the host memory to the first circuit if the bit corresponding thereto has the first value, and the second circuit transmits the second data stored in the volatile memory to the first circuit if the bit has the second value.

14. The method according to claim 9, further comprising:

reading the first data from the host memory and performing a decoding process on the first data read from the host memory; and when the decoding process fails in an error correction process of the first data read from the host memory, reporting an error if the bit corresponding to the read first data has the first value and performing the second operation if the bit has the second value.

15. The method according to claim 9, wherein the management data is at least one of: (i) a look-up table used in converting logical addresses to physical addresses; and (ii) count data that indicates the number of read operations performed on different groups of memory cells of the non-volatile memory or the number of valid clusters in different blocks of memory cells of the non-volatile memory.

* * * * *